(12) United States Patent
Knauft et al.

(10) Patent No.: US 10,642,526 B2
(45) Date of Patent: May 5, 2020

(54) SEAMLESS FAULT TOLERANCE VIA BLOCK REMAPPING AND EFFICIENT RECONCILIATION

(71) Applicant: VMware, Inc., Palo Alto, CA (US)

(72) Inventors: Eric Knauft, San Francisco, CA (US); Mansi Shah, Palo Alto, CA (US); Jin Zhang, Palo Alto, CA (US); Christian Dickmann, Unterschleissheim (DE); Pascal Renauld, Palo Alto, CA (US); Radhika Vullikanti, Palo Alto, CA (US); Christos Karamanolis, Los Gatos, CA (US)

(73) Assignee: VMware, Inc., Palo Alto, CA (US)

( * ) Notice: Subject to any disclaimer, the term of this patent is extended or adjusted under 35 U.S.C. 154(b) by 153 days.

(21) Appl. No.: 15/853,202

(22) Filed: Dec. 22, 2017

(65) Prior Publication Data

US 2019/0065062 A1    Feb. 28, 2019

Related U.S. Application Data

(60) Provisional application No. 62/551,187, filed on Aug. 28, 2017.

(51) Int. Cl.
*G06F 11/00*     (2006.01)
*G06F 3/06*      (2006.01)
(Continued)

(52) U.S. Cl.
CPC ............ *G06F 3/065* (2013.01); *G06F 3/0604* (2013.01); *G06F 3/067* (2013.01); *G06F 3/0617* (2013.01); *G06F 3/0631* (2013.01);

*G06F 3/0644* (2013.01); *G06F 3/0664* (2013.01); *G06F 3/0689* (2013.01); *G06F 9/45533* (2013.01);
(Continued)

(58) Field of Classification Search
CPC ............ G06F 11/0709; G06F 11/0712; G06F 11/0727; G06F 11/1423; G06F 11/1435; G06F 11/1484; G06F 11/1662; G06F 11/203; G06F 11/2058; G06F 11/2097; G06F 3/0635; G06F 3/065; G06F 3/0662; G06F 3/0689
See application file for complete search history.

(56) References Cited

U.S. PATENT DOCUMENTS 6,148,377 A    11/2000  Carter et al.
8,918,619 B2 * 12/2014  Yochai ................ G06F 3/0605
                                                711/154
(Continued)

*Primary Examiner* — Elmira Mehrmanesh
(74) *Attorney, Agent, or Firm* — Patterson + Sheridan, LLP

(57) ABSTRACT

In a storage cluster having nodes, blocks of a logical storage space of a storage object are allocated flexibly by a parent node to component nodes that are backed by physical storage. The method includes maintaining a first allocation map for the parent node, and second and third allocation maps for the first and second component nodes, respectively, executing a first write operation on the first component node and updating the second allocation map to indicate that the first block is a written block, and upon detecting that the first component node is offline, executing a second write operation that targets a second block of the logical storage space, which is allocated to the first component node, on the second component node and updating the third allocation map to indicate that the second block is a written block.

20 Claims, 23 Drawing Sheets

(51) Int. Cl.
  *G06F 9/455* (2018.01)
  *G06F 11/07* (2006.01)
(52) U.S. Cl.
  CPC ...... *G06F 11/0709* (2013.01); *G06F 11/0727* (2013.01); *G06F 11/0751* (2013.01); *G06F 11/0793* (2013.01); *G06F 2009/45583* (2013.01)

(56) References Cited

U.S. PATENT DOCUMENTS

| | | | | |
|---|---|---|---|---|
| 8,924,773 | B1* | 12/2014 | Veeraswamy | G06F 11/0793 714/6.1 |
| 8,983,988 | B2* | 3/2015 | Joshi | G06F 9/45558 707/758 |
| 9,390,055 | B2* | 7/2016 | Warfield | G06F 15/17331 |
| 9,552,242 | B1* | 1/2017 | Leshinsky | G06F 11/0727 |
| 9,672,115 | B2* | 6/2017 | Earl | G06F 11/1425 |
| 9,811,531 | B2* | 11/2017 | Karamanolis | G06F 16/182 |
| 2013/0346557 | A1* | 12/2013 | Chang | G06F 9/45558 709/217 |
| 2015/0058306 | A1* | 2/2015 | Earl | G06F 16/1774 707/703 |
| 2015/0058555 | A1* | 2/2015 | Karamanolis | G06F 3/0689 711/114 |
| 2015/0058863 | A1* | 2/2015 | Karamanolis | G06F 9/5083 718/105 |
| 2016/0323237 | A1* | 11/2016 | Warfield | G06F 15/17331 |
| 2017/0329541 | A1* | 11/2017 | Hayasaka | G06F 3/064 |

* cited by examiner

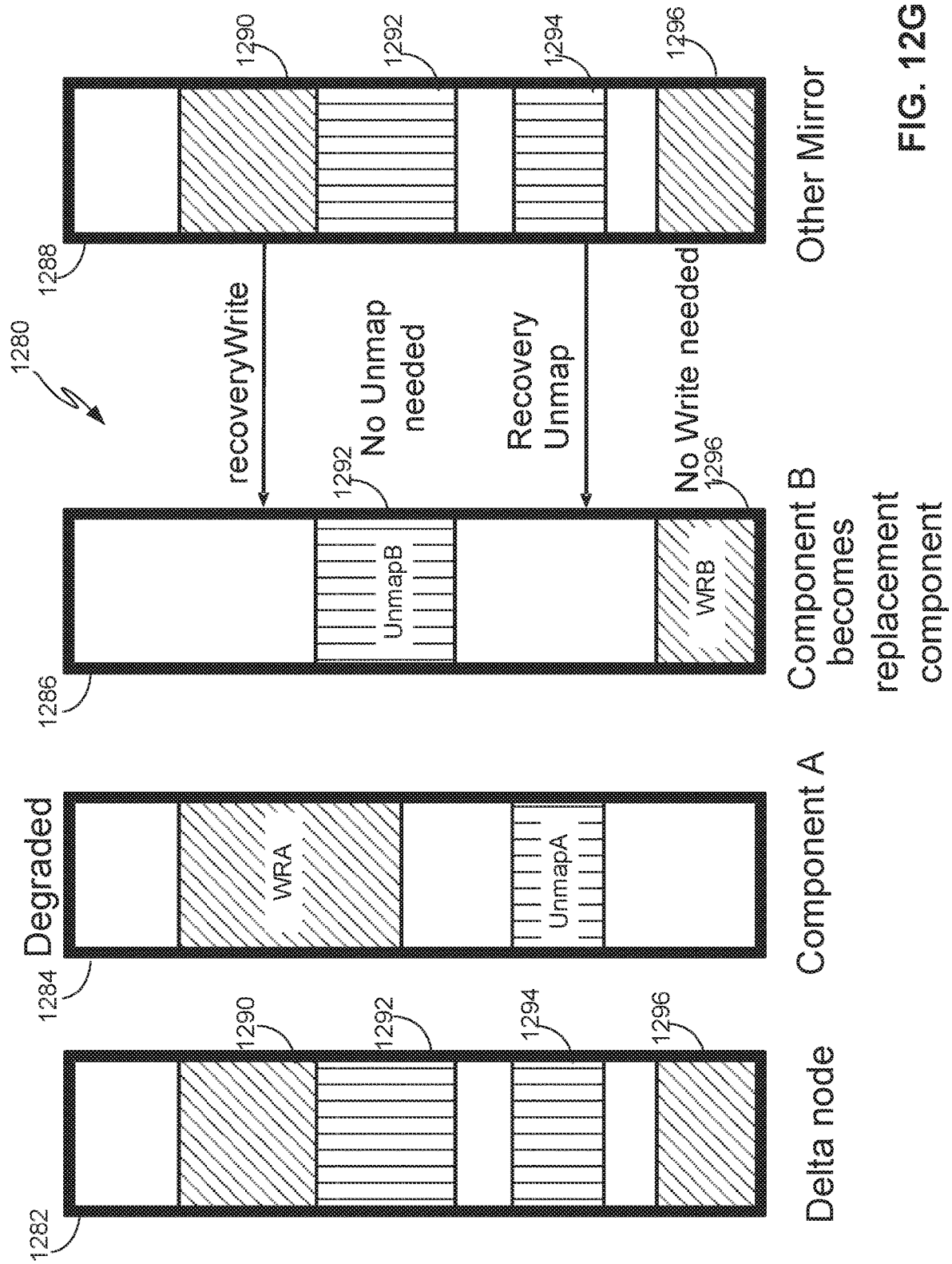

SEAMLESS FAULT TOLERANCE VIA BLOCK REMAPPING AND EFFICIENT RECONCILIATION

CROSS-REFERENCE TO RELATED APPLICATION(S)

This application claims the benefit of priority from U.S. Provisional Patent Application No. 62/551,187, filed Aug. 28, 2017, which is incorporated by reference herein.

BACKGROUND

In a storage cluster having multiple components backed by physical storage devices with the components organized in one or more RAID configurations, it often occurs that the RAID configurations are inflexible in their placement of data on the components. For example, when two components participate in a RAID striping arrangement, the RAID striping node places data of even blocks on one component and data of odd blocks on the other component. It may occur that one of the storage devices backing the even or odd component becomes full, in which case all operations using the component may need to stop until space is freed up on the backing storage device by moving the data assigned to the component to another component.

Not only are components in a RAID configuration vulnerable to having their backing storage device filling up but the RAID configuration is also vulnerable to a data loss when the component itself is taken offline temporarily for maintenance or other reasons. During the time that the component is offline, data can be lost if a component in the RAID configuration mirroring the offline component fails.

BRIEF DESCRIPTION OF THE DRAWINGS

FIG. 12G depicts allocation maps relating to components of the delta node when restoring one of the components that permanently failed.

DETAILED DESCRIPTION

One embodiment provides a new RAID primitive (also referred to as a RAID node), RAID-FLEXIBLE (RF), which can be joined with other existing RAID nodes, such as RAID0, RAID1, RAID5, and RAID6, in a RAID tree. Each RF node has multiple components (also referred to as child nodes) in which data blocks can be placed, and the RF node selects the component for placing a data block at the time of first write into the data block. Even after placement, data blocks can be shifted from one component to another, for example, when the backing storage for a component is overcrowded. This embodiment achieves better balance in the usage of storage cluster resources through increased flexibility in the initial placement of data blocks as well as shifting of data block placements between components.

Another embodiment provides data block remapping between multiple components as a way to tolerate transient failures in a distributed storage system. The embodiment employs a delta node, which can be implemented as an RF node and composed with other existing RAID nodes in a RAID tree. Like the RF node, the delta node has multiple components in which a given data block can be placed. When a component of a delta node that is responsible for a given data block experiences a failure or runs out of free space, new writes to this data block are redirected to another component of the delta node. When the original component comes back online, any conflicts between components are resolved.

Figure 1:
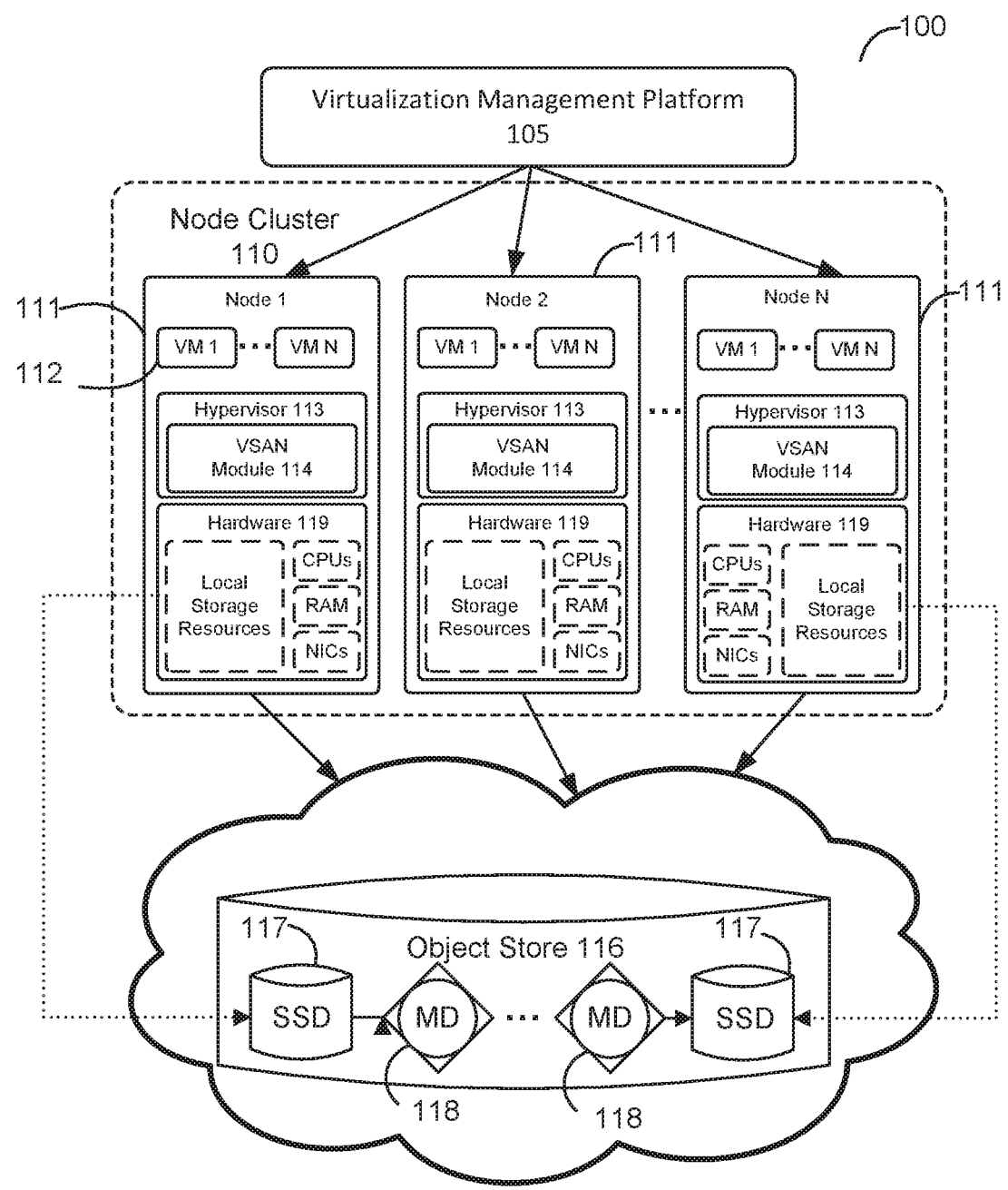
FIG. 1 depicts a computing environment in which one or more embodiments may be implemented.

FIG. 1 depicts a computing environment 100 in which one or more embodiments may be implemented. As shown, computing environment 100 is a VSAN environment that leverages the commodity local storage housed in or directly attached (hereinafter, use of the term "housed" or "housed in" may be used to encompass both housed in or otherwise directly attached) to host servers or nodes 111 of a cluster 110 to provide an aggregate object store 116 to virtual machines (VMs) 112 running on the nodes. The local commodity storage housed in or otherwise directly attached to the nodes 111 may include combinations of solid state drives (SSDs) 117 and/or magnetic or spinning disks 118. In certain embodiments, SSDs 117 serve as a read cache and/or write buffer in front of magnetic disks 118 to increase I/O performance.

A virtualization management platform 105 is associated with cluster 110 of nodes 111. Virtualization management platform 105 enables an administrator to manage the configuration and spawning of VMs on the various nodes 111. As depicted in the embodiment of FIG. 1, each node 111 includes a virtualization layer or hypervisor 113, a VSAN module 114, and hardware 119 (which includes the SSDs 117 and magnetic disks 118 of a node 111). Through hypervisor 113, a node 111 is able to launch and run multiple VMs 112. Hypervisor 113, in part, manages hardware 119 to properly allocate computing resources (e.g., processing power, random access memory, etc.) for each VM 112. Furthermore, as described further below, each hypervisor 113, through its corresponding VSAN module 114, provides access to storage resources located in hardware 119 (e.g., SSDs 117 and magnetic disks 118) for use as storage for virtual disks (or portions thereof) and other related files that may be accessed by any VM 112 residing in any of nodes 111 in cluster 110. In a particular embodiment, vSphere® hypervisor from VMware, Inc. (VMware) may be installed on nodes 111 as hypervisor 113 and vCenter Server from VMware may be used as virtualization management platform 105.

In one embodiment, VSAN module 114 is implemented as a "VSAN" device driver within hypervisor 113. In such an embodiment, VSAN module 114 provides access to a conceptual "VSAN" through which an administrator can create a number of top-level "device" or namespace objects that are backed by object store 116. In one common scenario, during creation of a device object, the administrator may specify a particular file system for the device object (such device objects hereinafter also thus referred to "file system objects"). For example, in one embodiment, each hypervisor 113 in each node 111 may, during a boot process, discover a /vsan/root node for a conceptual global namespace that is exposed by VSAN module 114. By, for example, accessing APIs exposed by VSAN module 114, hypervisor 113 can then determine all the top-level file system objects (or other types of top-level device objects) currently residing in VSAN. When a VM (or other client) attempts to access one of the file system objects, hypervisor 113 may dynamically "auto-mount" the file system object at that time. A file system object (e.g., /vsan/fs_name1, etc.) that is accessible through VSAN may, for example, be implemented to emulate the semantics of a particular file system such as VMware's distributed or clustered file system, VMFS, which is designed to provide concurrency control among simultaneously accessing VMs. Because VSAN supports multiple file system objects, it is able provide storage resources through object store 116 without being confined by limitations of any particular clustered file system. For example, many clustered file systems (e.g., VMFS, etc.) can only scale to support a certain amount of nodes 111. By providing multiple top-level file system object support, VSAN overcomes the scalability limitations of such clustered file systems. Though VSAN is shown supporting multiple nodes, in some embodiments, the VSAN is confined to supporting a particular node's hardware 119.

As described in further detail in the context of FIG. 2 below, a file system object, may, itself, provide access to a number of virtual disk descriptor files (e.g., .vmdk files in a vSphere environment, etc.) accessible by VMs 112 running in cluster 110. These virtual disk descriptor files contain references to virtual disk "objects" that contain the actual data for the virtual disk and are separately backed by object store 116. A virtual disk object may itself be a hierarchical or "composite" object that, as described further below, is further composed of "component" objects (again separately backed by object store 116) that reflect the storage requirements (e.g., capacity, availability, IOPs, etc.) of a corresponding storage profile or policy generated by the administrator when initially creating the virtual disk. As further discussed below, each VSAN module 114 (through cluster monitoring, membership and directory services sub-module or "CMMDS" sub-module, in embodiments as further described below) communicates with other VSAN modules 114 of other nodes 111 to create and maintain an in-memory metadata database (e.g., maintained separately but in synchronized fashion in the memory of each node 111) that contains metadata describing the locations, configurations, policies and relationships among the various objects stored in object store 116. This in-memory metadata database is utilized by a VSAN module 114 on a node 111, for example, when an administrator first creates a virtual disk for a VM as well as when the VM is running and performing I/O operations (e.g., read or write) on the virtual disk. As further discussed below in the context of FIG. 3, VSAN module 114 (through a document object manager or "DOM" sub-module, in one embodiment as further described below) traverses a hierarchy of objects using the metadata in the in-memory database in order to properly route an I/O operation request to the node (or nodes) that houses (house) the actual physical local storage that backs the portion of the virtual disk that is subject to the I/O operation.

Figure 2:
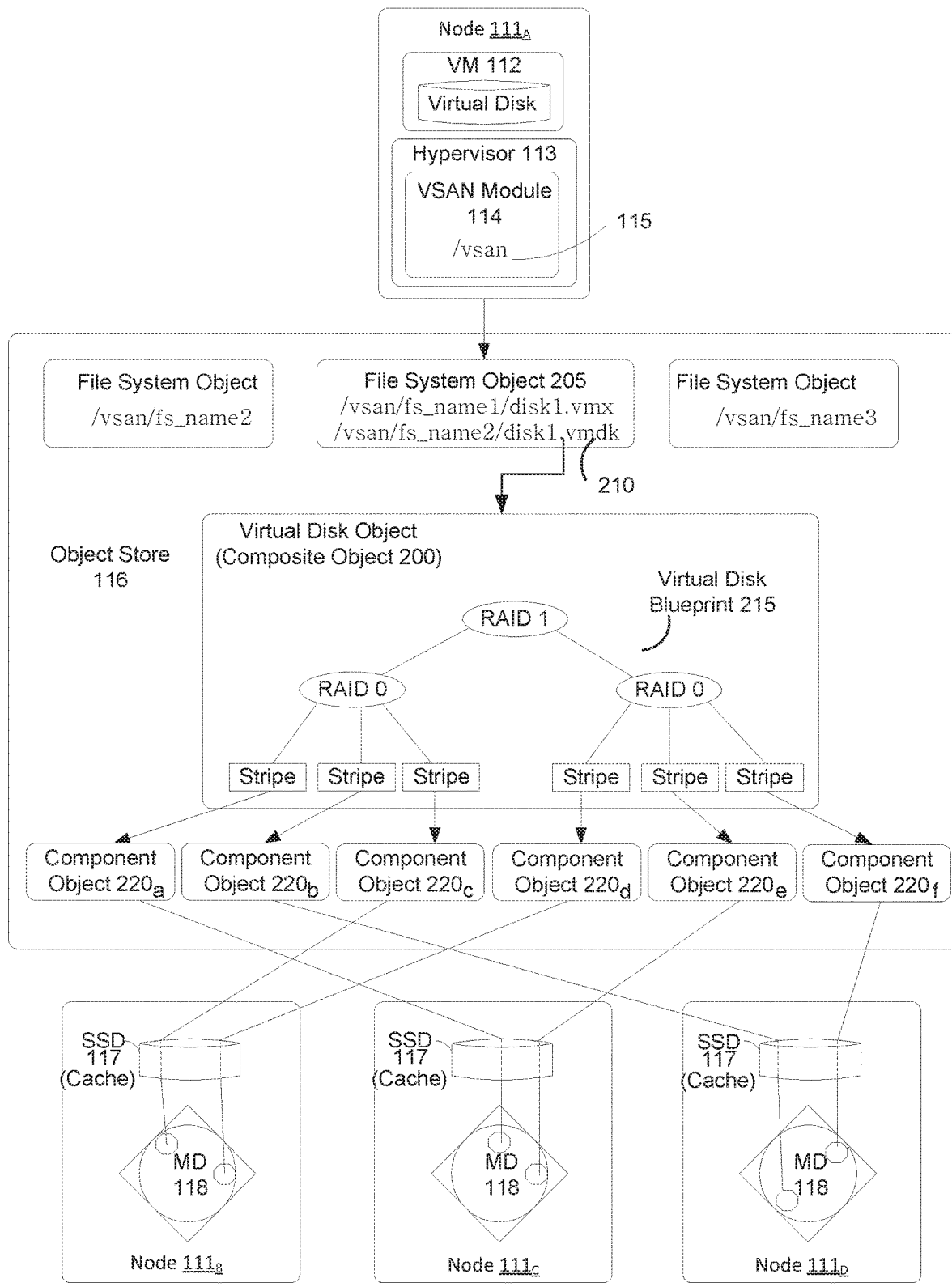
FIG. 2 depicts an example hierarchical structure of storage objects that represent a virtual disk.

FIG. 2 depicts an example hierarchical structure of storage objects that represent a virtual disk. As previously discussed above, a VM 112 running on one of nodes 111 may perform I/O operations on a virtual disk that is stored as a hierarchical or composite object 200 in object store 116. Hypervisor 113 provides VM 112 access to the virtual disk by interfacing with the abstraction of VSAN through VSAN module 114 (e.g., by auto-mounting the top-level file system object corresponding to the virtual disk object, as previously discussed, in one embodiment). For example, VSAN module 114, by querying its local copy of the in-memory metadata database, is able to identify a particular file system object 205 (e.g., a VMFS file system object in one embodiment, etc.) stored in VSAN that stores a descriptor file 210 for the virtual disk (e.g., a .vmdk file, etc.). It should be recognized that the file system object 205 may store a variety of other files consistent with its purpose, such as virtual machine configuration files (e.g., .vmx files in a vSphere environment, etc.) and the like when supporting a virtualization environment. In certain embodiments, each file system object may be configured to support only those virtual disks corresponding to a particular VM (e.g., a "per-VM" file system object).

Descriptor file 210 includes a reference to composite object 200 that is separately stored in object store 116 and conceptually represents the virtual disk (and thus may also be sometimes referenced herein as a virtual disk object). Composite object 200 stores metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPS, etc.) generated by an administrator when creating the virtual disk. For example, composite object 200 includes a virtual disk blueprint 215 that describes a RAID 1 configuration where two mirrored copies of the virtual disk (e.g., mirrors) are each further striped in a RAID 0 configuration. Composite object 225 may thus contain references to a number of "leaf" or "component" objects 220x corresponding to each stripe (e.g., data partition of the virtual disk) in each of the virtual disk mirrors. The metadata accessible by VSAN module 114 in the in-memory metadata database for each component object 220 (e.g., for each stripe) provides a mapping to or otherwise identifies a particular node 111 x in cluster 110 that houses the physical storage resources (e.g., magnetic disks 118, etc.) that actually store the stripe (as well as the location of the stripe within such physical resource).

Figure 3:
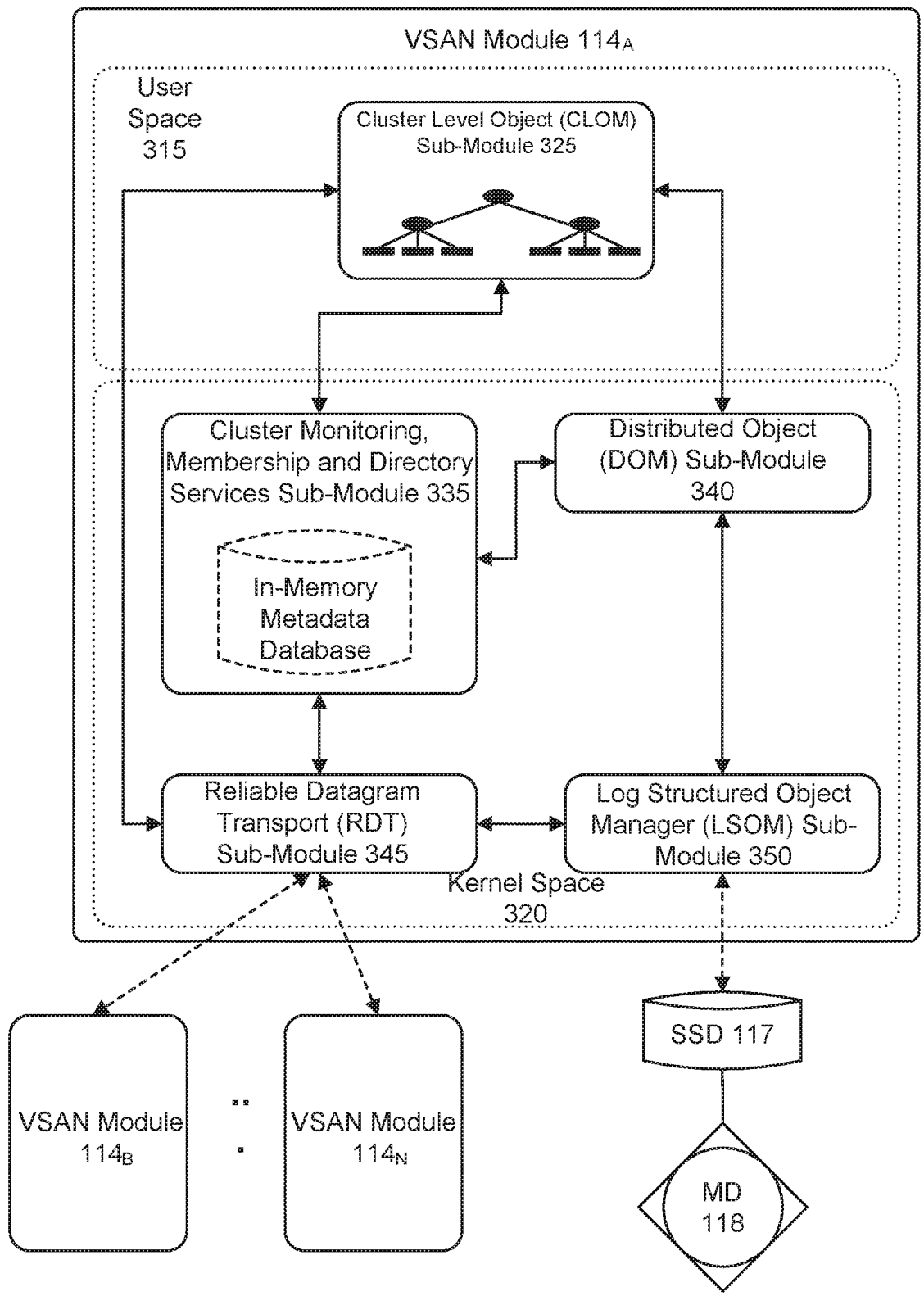
FIG. 3 depicts components of a virtual storage area network (VSAN) module.

FIG. 3 depicts components of a VSAN module 114. As previously described, in certain embodiments, VSAN module 114 may execute as a device driver exposing an abstraction of a VSAN to hypervisor 113. Various sub-modules of VSAN module 114 handle different responsibilities and may operate within either user space 315 or kernel space 320 depending on such responsibilities. As depicted in FIG. 3, VSAN module 114 includes a cluster level object management (CLOM) sub-module 325 that operates in user space 315. CLOM sub-module 325 generates virtual disk blueprints during creation of a virtual disk by an administrator and ensures that objects created for such virtual disk blueprints are configured to meet storage profile or policy requirements set by the administrator. In addition to being accessed during object creation (e.g., for virtual disks), CLOM sub-module 325 may also be accessed (e.g., to dynamically revise or otherwise update a virtual disk blueprint or the mappings of the virtual disk blueprint to actual physical storage in object store 116) on a change made by an administrator to the storage profile or policy relating to an object or when changes to the cluster or workload result in an object being out of compliance with a current storage profile or policy.

In one embodiment, if an administrator creates a storage profile or policy for a composite object such as virtual disk object 200, CLOM sub-module 325 applies a variety of heuristics and/or distributed algorithms to generate virtual disk blueprint 215 that describes a configuration in cluster 110 that meets or otherwise suits the storage policy (e.g., RAID configuration to achieve desired redundancy through mirroring and access performance through striping, which nodes' local storage should store certain portions/partitions/stripes of the virtual disk to achieve load balancing, etc.). For example, CLOM sub-module 325, in one embodiment, is responsible for generating blueprint 215 describing the RAID1/RAID0 configuration for virtual disk object 200 in FIG. 2 when the virtual disk was first created by the administrator. As previously discussed, a storage policy may specify requirements for capacity, IOPS, availability, and reliability. Storage policies may also specify a workload characterization (e.g., random or sequential access, I/O request size, cache size, expected cache hit ration, etc.). Additionally, the administrator may also specify an affinity to VSAN module 114 to preferentially use certain nodes 111 (or the local disks housed therein). For example, when provisioning a new virtual disk for a VM, an administrator may generate a storage policy or profile for the virtual disk specifying that the virtual disk have a reserve capacity of 400 GB, a reservation of 150 read TOPS, a reservation of 300 write IOPS, and a desired availability of 99.99%. Upon receipt of the generated storage policy, CLOM sub-module 325 consults the in memory metadata database maintained by its VSAN module 114 to determine the current state of cluster 110 in order generate a virtual disk blueprint for a composite object (e.g., the virtual disk object) that suits the generated storage policy. As further discussed below, CLOM sub-module 325 may then communicate the blueprint to its corresponding distributed object manager (DOM) sub-module 340 which interacts with object space 116 to implement the blueprint by, for example, allocating or otherwise mapping component objects (e.g., stripes) of the composite object to physical storage locations within various nodes 111 of cluster 110.

In addition to CLOM sub-module 325 and DOM sub-module 340, as further depicted in FIG. 3, VSAN module 114 may also include a cluster monitoring, membership, and directory services (CMMDS) sub-module 335 that maintains the previously discussed in memory metadata database to provide information on the state of cluster 110 to other sub-modules of VSAN module 114 and also tracks the general "health" of cluster 110 by monitoring the status, accessibility, and visibility of each node 111 in cluster 110. The in-memory metadata database serves as a directory service that maintains a physical inventory of the VSAN environment, such as the various nodes 111, the storage resources in the nodes 111 (SSD, magnetic disks, etc.) housed therein and the characteristics/capabilities thereof, the current state of the nodes 111 and there corresponding storage resources, network paths among the nodes 111, and the like. As previously discussed, in addition to maintaining a physical inventory, the in memory metadata database further provides a catalog of metadata for objects stored in object store 116 (e.g., what composite and component objects exist, what component objects belong to what composite objects, which nodes serve as "coordinators" or "owners" that control access to which objects, quality of service requirements for each object, object configurations, the mapping of objects to physical storage locations, etc.). As previously discussed, other sub-modules within VSAN module 114 may access CMMDS sub-module 335 (represented by the connecting lines in FIG. 3) for updates to learn of changes in cluster topology and object configurations. For example, as previously discussed, during virtual disk creation, CLOM sub-module 325 accesses the in-memory metadata database to generate a virtual disk blueprint, and in order to handle an I/O operation from a running VM 112, DOM sub-module 340 accesses the in-memory metadata database to determine the nodes 111 that store the component objects (e.g., stripes) of a corresponding composite object (e.g., virtual disk object) and the paths by which those nodes are reachable in order to satisfy the I/O operation.

As previously discussed, DOM sub-module 340, during the handling of I/O operations as well as during object creation, controls access to and handles operations on those component objects in object store 116 that are stored in the local storage of the particular node 111 in which DOM sub-module 340 runs as well as certain other composite objects for which its node 111 has been currently designated as the "coordinator" or "owner." For example, when handling an I/O operation from a VM, due to the hierarchical nature of composite objects in certain embodiments, a DOM sub-module 340 that serves as the coordinator for the target composite object (e.g., the virtual disk object that is subject to the I/O operation) may need to further communicate across the network with a different DOM sub-module 340 in a second node 111 (or nodes) that serves as the coordinator for the particular component object (e.g., stripe, etc.) of the virtual disk object that is stored in the local storage of the second node 111 and which is the portion of the virtual disk that is subject to the I/O operation. If the VM issuing the I/O operation resides on a node 111 that is also different from the coordinator of the virtual disk object, the DOM sub-module 340 of the node running the VM would also have to communicate across the network with the DOM sub-module 340 of the coordinator. In certain embodiments, if the VM issuing the I/O operation resides on node that is different from the coordinator of the virtual disk object subject to the I/O operation, the two DOM sub-modules 340 of the two nodes may to communicate to change the role of the coordinator of the virtual disk object to the node running the VM (e.g., thereby reducing the amount of network communication needed to coordinate I/O operations between the node running the VM and the node serving as the coordinator for the virtual disk object).

DOM sub-modules 340 also similarly communicate among one another during object creation. For example, a virtual disk blueprint generated by CLOM module 325 during creation of a virtual disk may include information that designates which nodes 111 should serve as the coordinators for the virtual disk object as well as its corresponding component objects (stripes, etc.). Each of the DOM sub-modules 340 for such designated nodes is issued requests (e.g., by the DOM sub-module 340 designated as the coordinator for the virtual disk object or by the DOM sub-module 340 of the node generating the virtual disk blueprint, etc. depending on embodiments) to create their respective objects, allocate local storage to such objects (if needed), and advertise their objects to their corresponding CMMDS sub-module 335 in order to update the in-memory metadata database with metadata regarding the object. In order to perform such requests, DOM sub-module 340 interacts with a log structured object manager (LSOM) sub-module 350 that serves as the component in VSAN module 114 that actually drives communication with the local SSDs and magnetic disks of its node 111. In addition to allocating local storage for component objects (as well as to store other metadata such a policies and configurations for composite objects for which its node serves as coordinator, etc.), LSOM sub-module 350 additionally monitors the flow of I/O operations to the local storage of its node 111, for example, to report whether a storage resource is congested.

FIG. 3 also depicts a reliable datagram transport (RDT) sub-module 345 that delivers datagrams of arbitrary size between logical endpoints (e.g., nodes, objects, etc.), where the endpoints may potentially be over multiple paths. In one embodiment, the underlying transport is TCP. Alternatively, other transports such as RDMA may be used. RDT sub-module 345 is used, for example, when DOM sub-modules 340 communicate with one another, as previously discussed above to create objects or to handle I/O operations. In certain embodiments, RDT module 345 interacts with CMMDS module 335 to resolve the address of logical endpoints dynamically in order to maintain up-to-date location information in the in memory metadata database as well as to create, remove, or reestablish connections based on link health status. For example, if CMMDS module 335 reports a link as unhealthy, RDT sub-module 345 may drop the connection in favor of a link in better condition.

Figure 4:
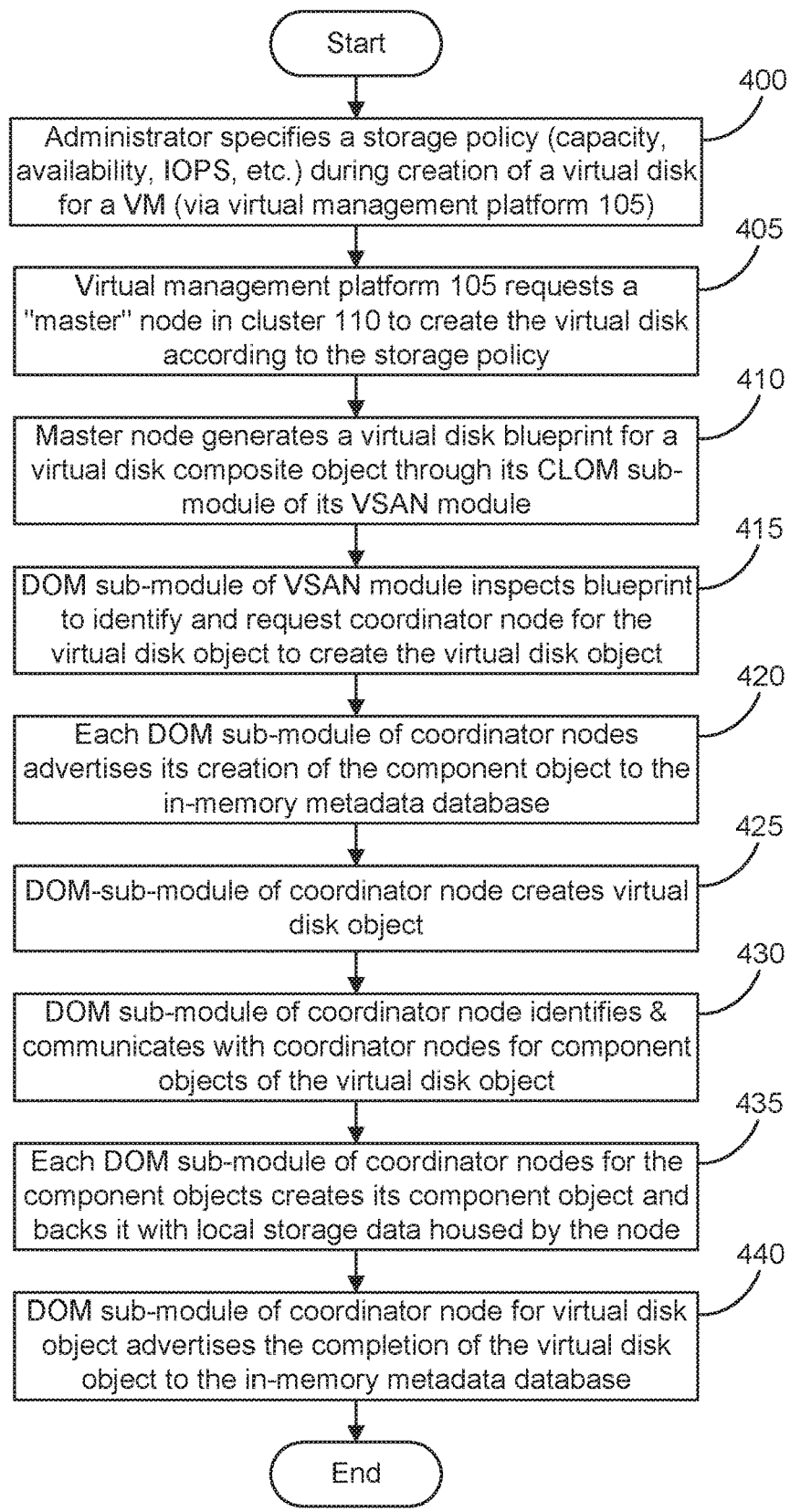
FIG. 4 depicts a method flow diagram for creating a virtual disk object based on a defined storage policy.

FIG. 4 depicts a method flow diagram for creating a virtual disk object based on a defined storage policy. For example, in step 400, an administrator may interact with a user interface of virtual management platform 105 to create a virtual disk having capacity, availability and IOPS requirements (e.g., the defined storage policy). In one embodiment, virtual management platform 105 may then request a "master" node 111 to create an object for the virtual disk in step 405. In step 410, such a master node 111 may generate a virtual disk blueprint through its CLOM sub-module 325 in VSAN module. As previously discussed, CLOM sub-module 35 generates a virtual disk blueprint for the creation of a virtual disk object (e.g., a composite object) based on the status of cluster 110 as determined by consulting the in-memory metadata database of CMMDS sub-module 335. The virtual disk blueprint may identify a particular node that should serve as the coordinator or owner of the virtual disk object. In step 415, the DOM sub-module 340 of the master node 111 may the request the DOM sub-module 340 of the identified node to create the virtual disk object. In step 420, the DOM sub-module 340 of the identified node receives the request and creates the virtual disk object, by, for example, communicating with its corresponding the LSOM sub-module 350 to persistently store metadata describing the virtual disk object in its local storage. In step 425, the DOM sub-module 340, based on the virtual disk object blueprint, identifies those others nodes in cluster 110 that have been designated to serve as the coordinator or owner for any component objects in the virtual disk blueprint. The DOM sub-module 340 communicates (e.g., using its RDT sub-module 345) with the DOM sub-modules 340 of the other nodes that will serve as coordinators for the component objects and store the data backing such component objects in their local storage. When such DOM sub-modules 340 receive a request from the DOM sub-module 340 of the coordinator of the virtual disk object to create their respective component objects, they, in turn in step 430, communicate with their respective LSOM modules 350 to allocate local storage for the component object (and its related metadata). Once such component objects have been created, their DOM sub-modules 340 advertise the creation of the components to the in-memory metadata database of its CMMDS sub-module 335 in step 435. In step 440, in turn, the DOM sub-module 340 for the coordinator of the virtual disk object also advertises its creation to its CMMDS sub-module 335 to update the in-memory metadata database and ultimately transmits an acknowledgement to the administrator (e.g., via the master node communications back to virtual management platform 105).

Figure 5:
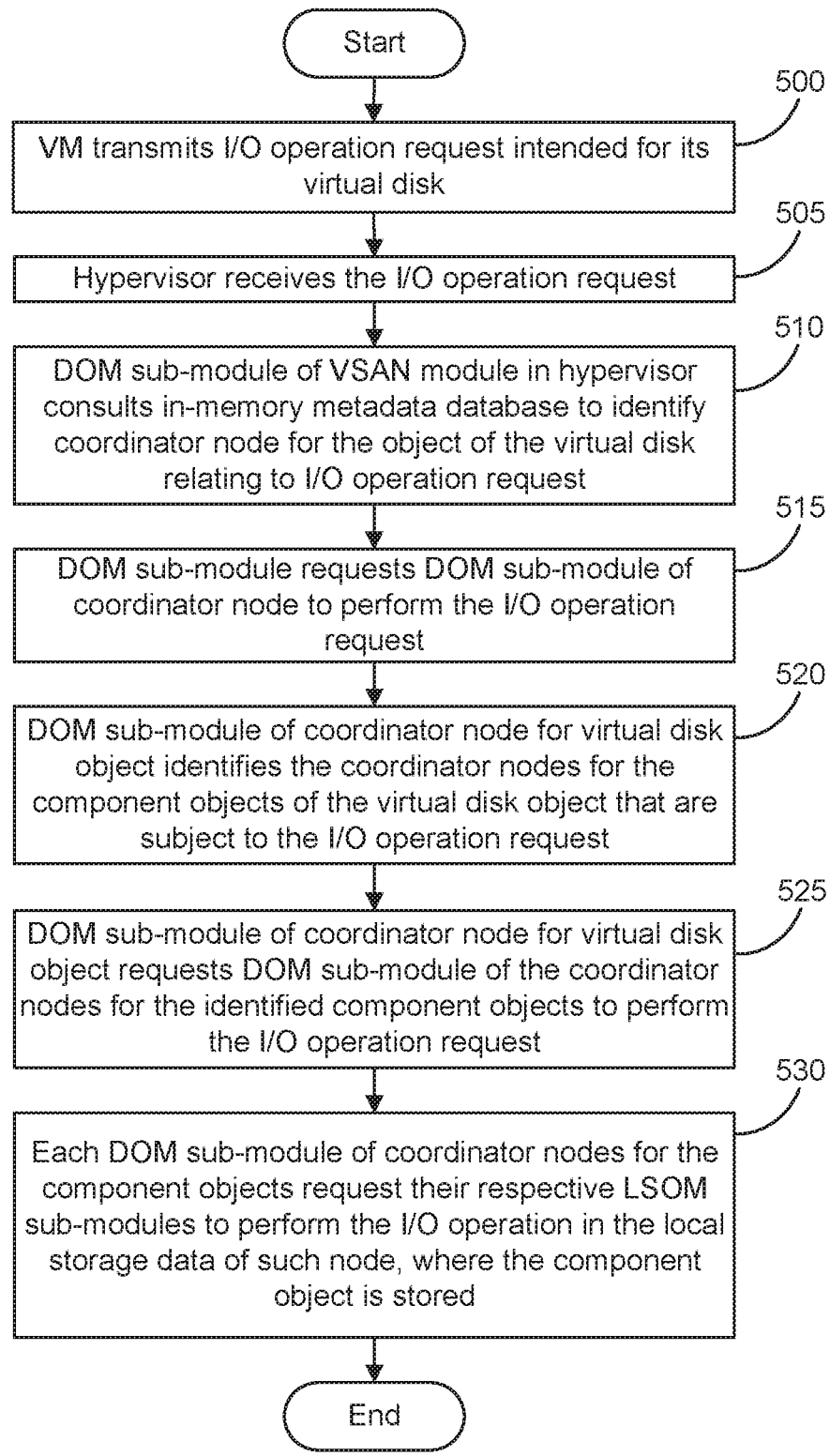
FIG. 5 depicts the handling of an I/O operation originating from a virtual machine (VM).

FIG. 5 depicts the handling of an I/O operation originating from a VM. When a VM running on a particular node performs I/O operations to its virtual disk, the VM's guest operating system, in step 500, transmits an I/O operation request intended for its virtual disk (through a device driver of the guest operating system) which, in step 505, is received by hypervisor 113 and ultimately transmitted and transformed through various layers of an I/O stack in hypervisor 113 to DOM sub-module 340 of VSAN module 114. In step 510, the I/O request received by DOM sub-module 340 includes a unique identifier for an object representing the virtual disk that DOM sub-module 340 uses to identify the coordinator node of the virtual disk object by accessing the in-memory metadata database of CMMDS sub-module 335 (in certain embodiments, accessing the in-memory metadata database to look up a mapping of the identity of the coordinator node to the unique identifier occurs only when the virtual disk object is initially accessed, with such mapping persisting for future I/O operations such that subsequent lookups are not needed). Upon identifying the coordinator node for the virtual disk object, the DOM sub-module 340 of the node running the VM communicates (e.g., using its RDT sub-module 345) with the DOM sub-module 340 of the coordinator node to request that it perform the I/O operation in step 515. As previously discussed, in certain embodiments, if the node running the VM and the node serving as coordinator of the virtual disk object are different, the two DOM sub-modules will communicate to update the role of the coordinator of the virtual disk object to be the node of the running VM. Upon the coordinator's receipt of the I/O request, in step 520, its DOM sub-module identifies (e.g., by again referencing the in-memory metadata database, in certain embodiments) those coordinator nodes for the particular component objects (e.g., stripes) of the virtual disk object that are subject to the I/O operation. For example, if the I/O operation spans multiple stripes (e.g., multiple component objects) of a RAID 0 configuration, DOM sub-module 340 may split the I/O operation and appropriately transmit correspond I/O requests to the respective coordinate nodes for the relevant component objects that correspond to the two stripes. In step 525, the DOM sub-module of the coordinator node for the virtual disk object requests that the DOM sub-modules for the coordinator nodes of the identified component objects perform the I/O operation request and, in step 530, the DOM sub-modules of such coordinator nodes for the identified component objects interact with their corresponding LSOM sub-modules to perform the I/O operation in the local storage resource where the component object is stored.

As mentioned above, RAID configurations can be specified by blueprint to improve data reliability and availability. More generally, a storage object can be built from a hierarchy or tree of RAID nodes sometime referred to as RAID primitives. RAID 1 (mirroring), RAID 0 (striping), RAID 5/6 (erasure encoding) are well known primitives that can be used in the tree. Each of these nodes results in a transformation of the address space of the storage object. For example, RAID 1 copies the address among its children and RAID 0 splits the address space up, in a round-robin fashion among its children without providing any replication. RAID5/6 does a combination of both, resulting in smaller sized components and some internal redundancy.

Figure 6B:
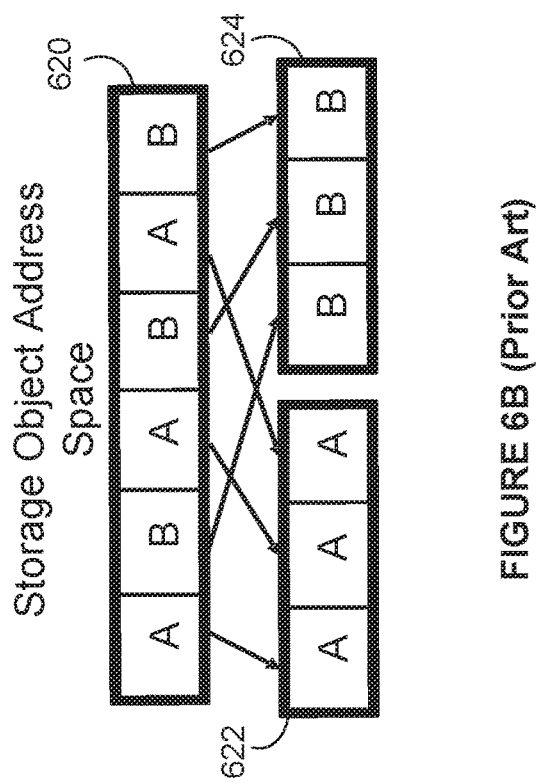
FIG. 6B depicts address spaces of a storage object and components of the RAID node in FIG. 6A.
Figure 6A:
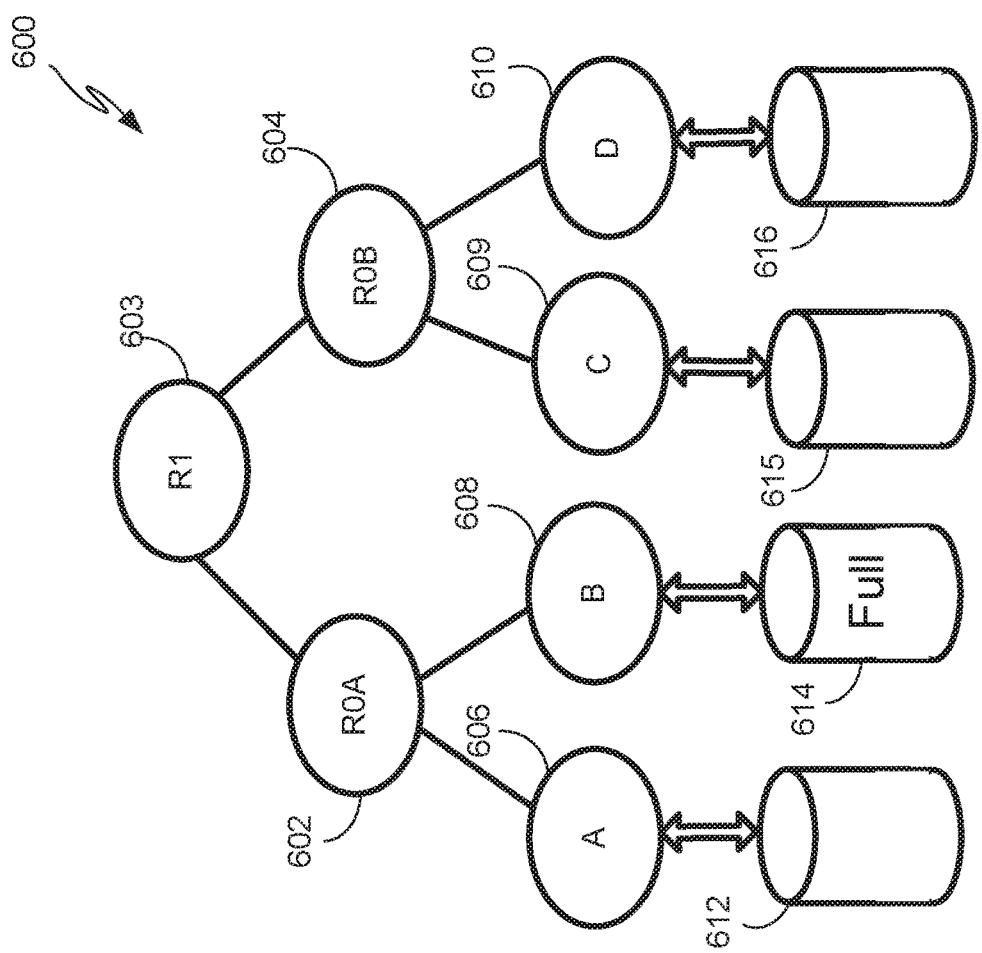
FIG. 6A depicts a conventional case in which RAID mirroring is employed.

FIG. 6A depicts an arrangement 600 in which RAID mirroring is employed, and FIG. 6B depicts an address space of a storage object and how it is mapped to address spaces of components. In the example depicted, component A 606 and component B 608 back node R0A 602, and component C 609 and component D 610 back node R0B, where node R0A 602 and node R0B 604 are RAID nodes that implement striping on their components and mirroring for node R1 603. Physical storage 612 backs component A 606, and physical storage 614 backs component B 608. Also, physical storage 615 backs component C 609, and physical storage 616 backs component D 610.

In the example of FIG. 6B, node R0A 602 is a RAID0 node and implements a fixed mapping of the address space of the storage object, address space 620, to address space 622 of component A 606 and address space 624 of component B. According to this implementation, all of odd blocks of address space 620 (labeled 'A' in FIG. 6B) are allocated to component A 606 and all of even blocks of address space 620 (labeled 'B' in FIG. 6B) are allocated to component B 608. A similar mapping exists for node R0B 604, which is also a RAID0 node. The fixed mapping described above, however, creates an inflexibility which is described below.

For example, if a 1000-block object is composed of two components (e.g., component A 606 and component B 608), each component is allocated 500 blocks. All of the odd blocks of the 1000-block object are allocated to component A 606 and all of the even blocks of the 1000-block object are allocated to component B 608. With these fixed allocations, a write into an odd block must go to component A 606 and a write into an even block must go to component B 608. Thus, if one of the physical storage backing a component becomes full, the entire component needs to be migrated. This inflexibility is problematic because it is not known in advance which backing storage will become full and will cause a resource imbalance in the storage cluster.

Figure 7B:
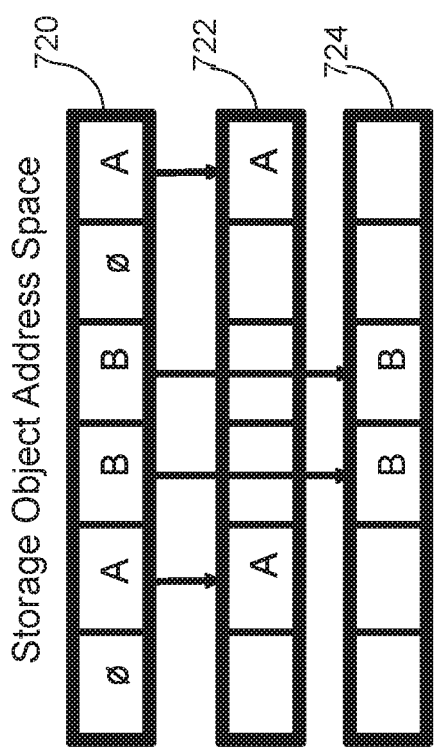
FIG. 7B depicts address spaces of a storage object and components of the RF node in FIG. 7A.
Figure 7A:
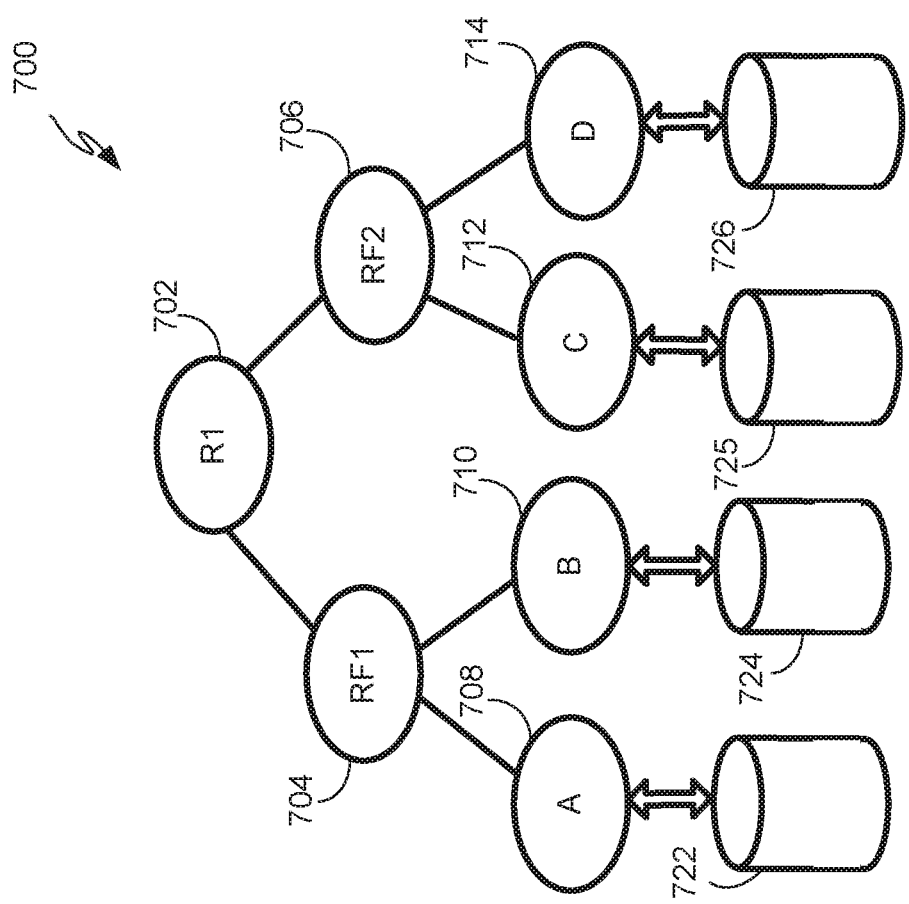
FIG. 7A depicts a new type of RAID primitive, referred to as RAID-FLEXIBLE (RF)

FIG. 7A illustrates an arrangement 700 that employs RF nodes. Node RF1 704 and node RF2 706 are RF nodes that can be used along with the standard RAID nodes described above in a tree of objects that make up a composite storage object, e.g., a virtual disk object. As illustrated in FIG. 7A, node RF1 704 has multiple components, component A 708 and component B 710, and node RF2 706 has multiple components, component C 712 and component D 714. Though node RF1 704 and node RF2 706 are shown as having two components, each can have two or more components. In addition, physical storage 722 backs component A 708, and physical storage 724 backs component B 710. Also, physical storage 725 backs component C 712, and physical storage 726 backs component D 714.

FIG. 7B depicts an address space 720 of a storage object and how it is mapped to address spaces of its components. According to embodiments, address space 720 and address spaces 722, 724 have the same size, and regions of address space 720 are flexibly mapped to address spaces 722, 724. In the example illustrated in FIG. 7B, the second and sixth regions of address space 720 (labeled 'A' in FIG. 7B) are allocated to component A 708 and the third and fourth regions of address space 720 (labeled 'B' in FIG. 7B) are mapped to component B 710. In contrast to the mapping depicted in FIG. 6B, the mapping from the address space of the storage object to address spaces of its components is flexible, and can be changed to relieve pressure on the components. The unit size of the regions is also flexible, and can be set to be same as a block size or at a larger granularity than the block size, e.g., an integer multiple of the block size.

In one embodiment, the mapping and region size information of the address space of the storage object is maintained in an allocation map. In one embodiment, the allocation map for the RF node is stored in an in-memory data structure of the RF node. In another embodiment, the allocation map for the RF node is stored as part of the in-memory database shown in FIG. 3. In addition, each of the components maintains a persistent allocation map in its backing physical storage, and updates the persistent allocation map each time it carries out a write command or an unmap command.

Figure 8A:
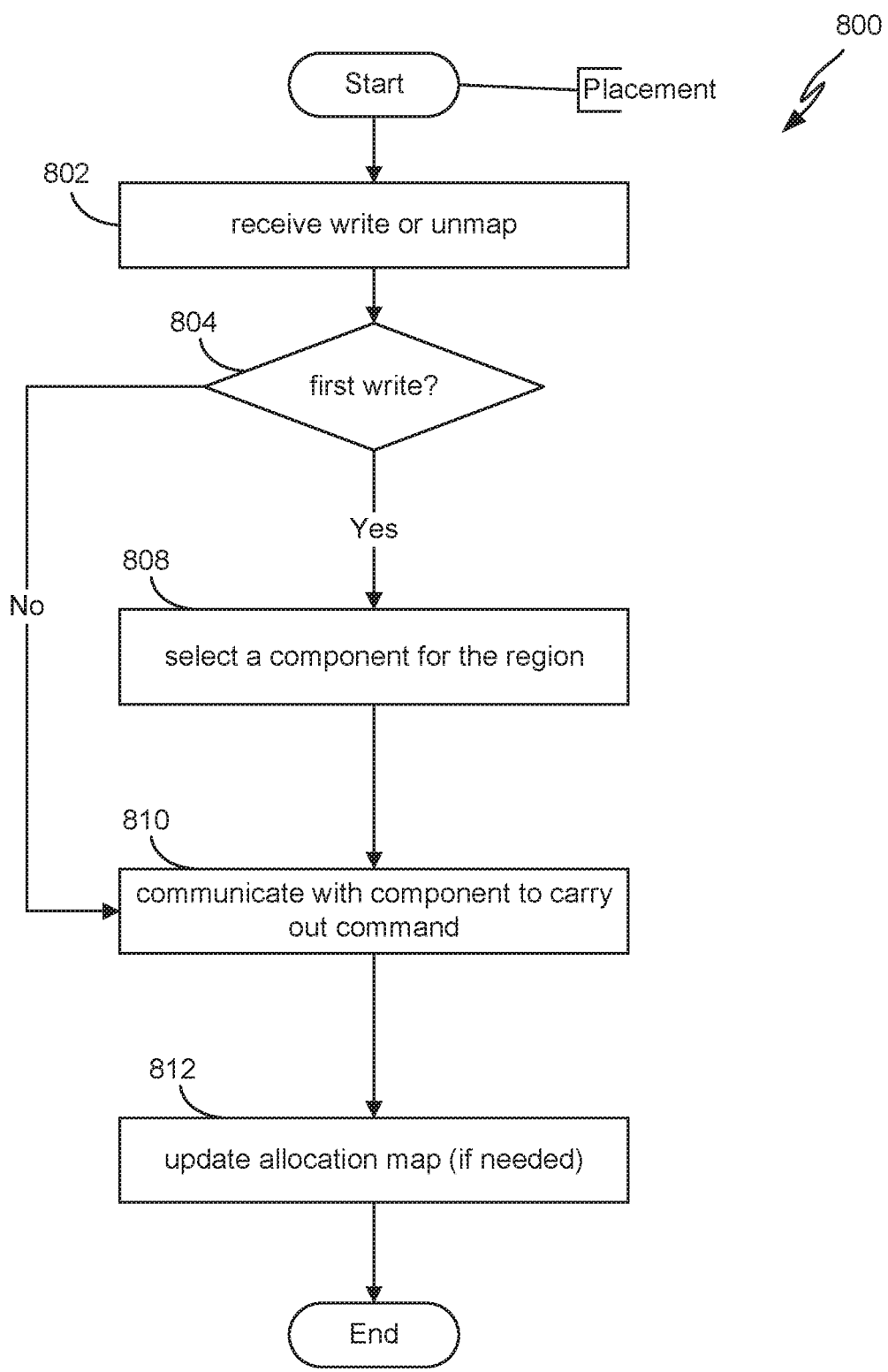
FIG. 8A depicts a flow diagram for allocating regions of the storage object address space to components of the RF node, according to one embodiment.

FIG. 8A depicts a flow diagram 800 for allocating regions of an address space of a storage object to components of the RF node, according to one embodiment. In the embodiment illustrated herein, the RF node is, for example, one of nodes 111 of computing environment 100, and implements the functionality of an intermediate RAID0 node shown in FIG. 2, and the components of the RF node are component objects 220. In step 802, the RF node receives a write command, which specifies a write into a region of the address space of the storage object, or an unmap command, which is an instruction to the component to unmap portions of the address space of the storage object. In step 804, the RF node determines whether the command specifies a first write into a region of the address space of the storage object. If so, in step 808, the RF node selects one of the components to which the region targeted by the write is to be allocated, and in step 810 the RF node communicates with the selected component to carry out the first write into the region. The selection in step 808 is made based on, for example, available space in the components (components with more available space being preferred over ones with less space available), relative throughput of the components (components with higher throughput being preferred over ones with less throughput), and the like. In step 812, the RF node updates its allocation map to indicate (1) that the region of the address space of the storage object targeted by a first write is now allocated to the selected component and (2) that the region has been written to or is unmapped. In this manner, the RF node can defer allocating a region of an address space of the storage object to a particular component until the first write to the region actually occurs. In addition, the component updates its persistent application map to indicate the write that has been processed within that region.

If, in step 804, the RF node determines that the write command specifies a write to a previously written region (i.e., a subsequent write), the RF node communicates with the component that owns the region (i.e., a component to which the region has been previously allocated) to carry out the subsequent write into the region in step 810. Then, in step 812, the component updates its persistent application map to indicate the write that has been processed within that region. It should be noted that the RF node does not update its allocation map because its allocation map already indicates that the region is allocated to component that is carrying out the subsequent write and the region has been written to.

If, in step 804, the RF node determines that an unmap command is received, the RF node communicates with the component that owns the region to carry out the unmap command. Then, in step 812, the RF node updates its allocation map to indicate the region is unmapped. In addition, the component updates its persistent application map to indicate that the region is unmapped.

Figure 8B:
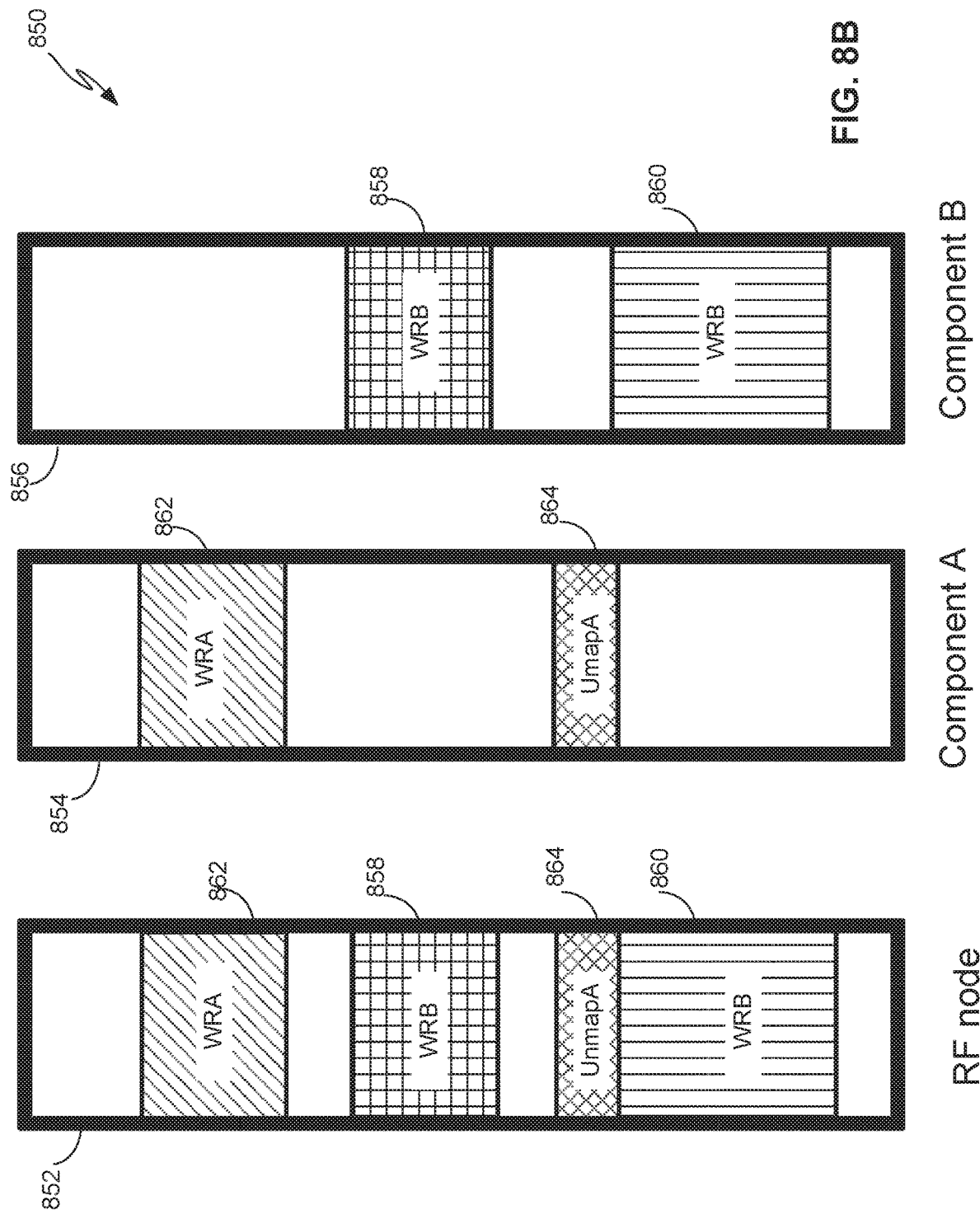
FIG. 8B depicts allocation maps relating to the RF node when allocation regions of the storage object address space onto the components of the RF node.

FIG. 8B depicts allocation maps 850 relating to the RF node, according to one embodiment. Shown in FIG. 8B is an allocation map 852 for the RF node, and allocation map 854 for component A and allocation map 856 for component B of the RF node. The allocation maps indicate that component A has a write region (WRA 862) and an unmap region (UnmapA 864), and that component B has two write regions (WRB 858 and WRB 860). Allocation map 852 is a composite of allocation maps 854, 856. In one embodiment, allocation map 852 is implemented so that it records, for each region, a byte that points to the component that owns the region and a bit that indicates whether it is a write region or an unmapped region.

Figure 9A:
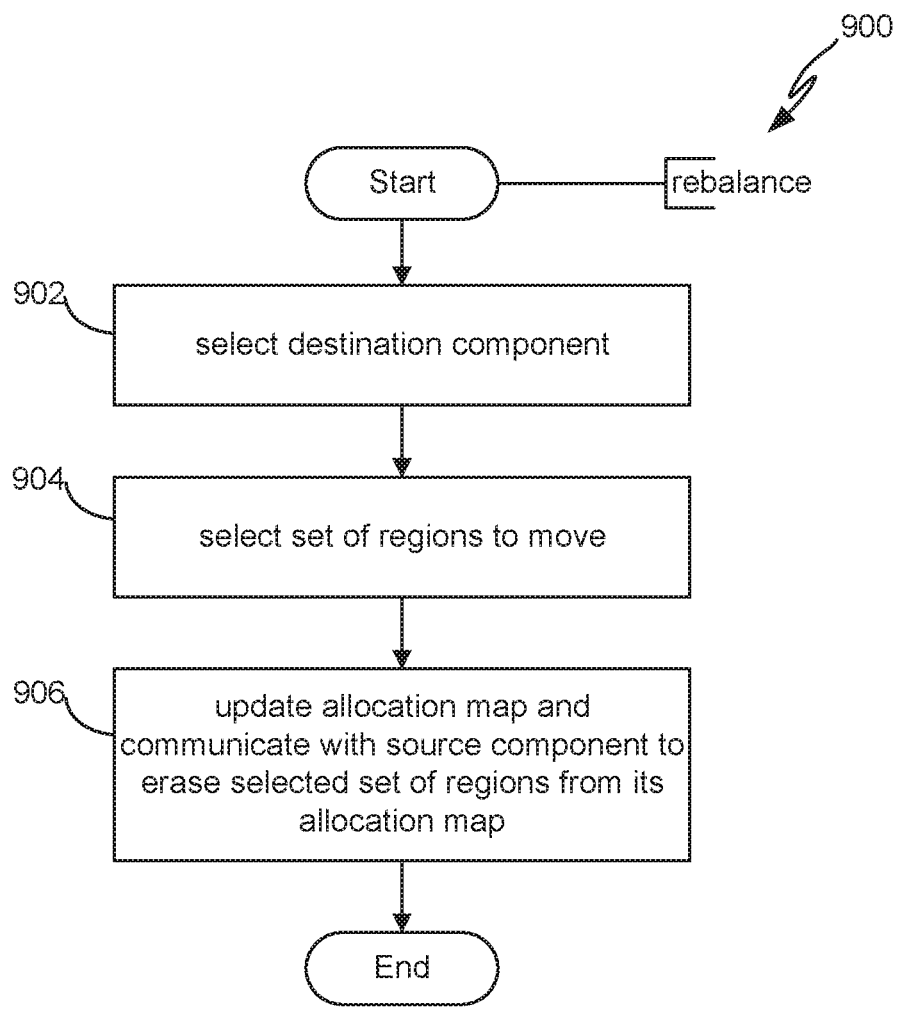
FIG. 9A depicts a flow diagram for rebalancing components of an RF node, according to one embodiment.

FIG. 9A depicts a flow diagram 900 for rebalancing components of an RF node, according to one embodiment. Rebalancing is performed if and when an RF node determines that one of its components is overloaded or has a backing physical storage that is becoming full (hereinafter referred to as "source component"). In step 902, the RF node selects a destination component to which one or more regions previously allocated to the source component are to be moved (reallocated). In step 904, the RF node selects the set of regions to move. In addition, the portions of the allocation map of the destination component corresponding to the moved regions are updated to be the same as the corresponding portions in the allocation map of the source component. After the allocation map of the destination component is updated, the copying of the data stored in the backing physical storage of the source component into the backing physical storage of the destination component can occur later, and in some embodiments, as a background operation. In step 906, the RF node updates its allocation map to indicate that the moved regions are now allocated to the destination component and communicates with the source component to erase the selected set of regions from its persistent allocation map, as it is required that a region be allocated to only one component of the RF node. The erase command is also referred to as a "punch hole" command, because it punches a hole through the persistent allocation map that is maintained by the source component.

Figure 9B:
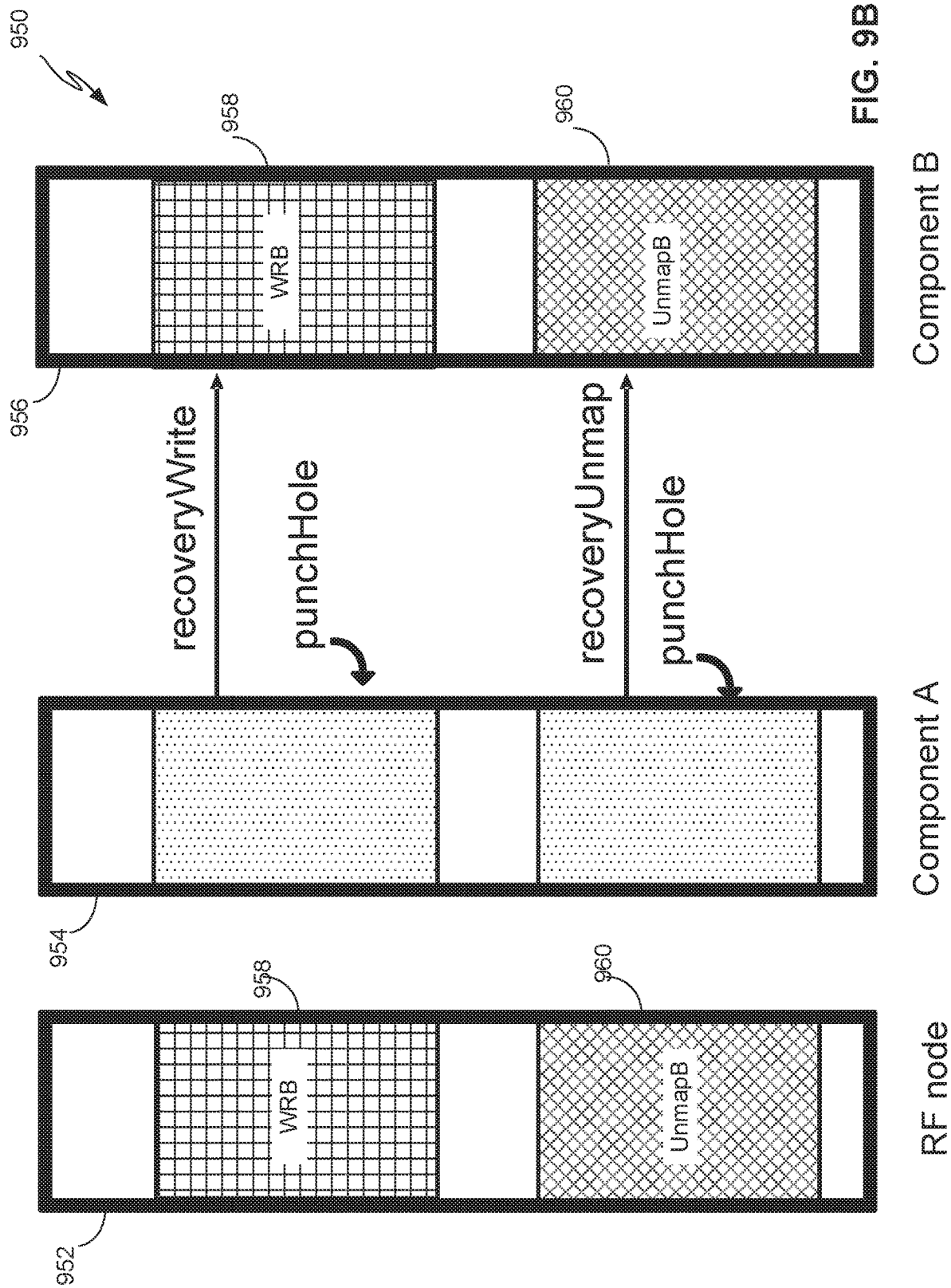
FIG. 9B depicts example allocation maps relating to the RF node when rebalancing components of the RF node.

FIG. 9B depicts example allocation maps 950 relating to the RF node when rebalancing components in accordance with the operations depicted in FIG. 9A. In FIG. 9B, component A is the source component and component B is the destination component. FIG. 9B depicts an example where the entire component is migrated. As a result of the migration, all three allocation maps shown in FIG. 9B are updated. Allocation map 952 is updated to indicate that the regions previously allocated to component A are now allocated to component B. Allocation map 954 is updated to remove the moved regions therefrom. Allocation map 956 is updated to indicate the two moved regions (write region WRB 958 and UnmapB region 960).

Component Failure

In one embodiment, remapping between multiple components are employed to tolerate transient failures in a distributed storage system. In the example of a composite storage object that employs a RAID1 configuration, if one of the mirror nodes (first node) experiences a transient failure, the other mirror node (second node) is still available to service reads and writes. However, if during the transient failure of the first node, the second node permanently fails, data loss is declared.

Figure 10A:
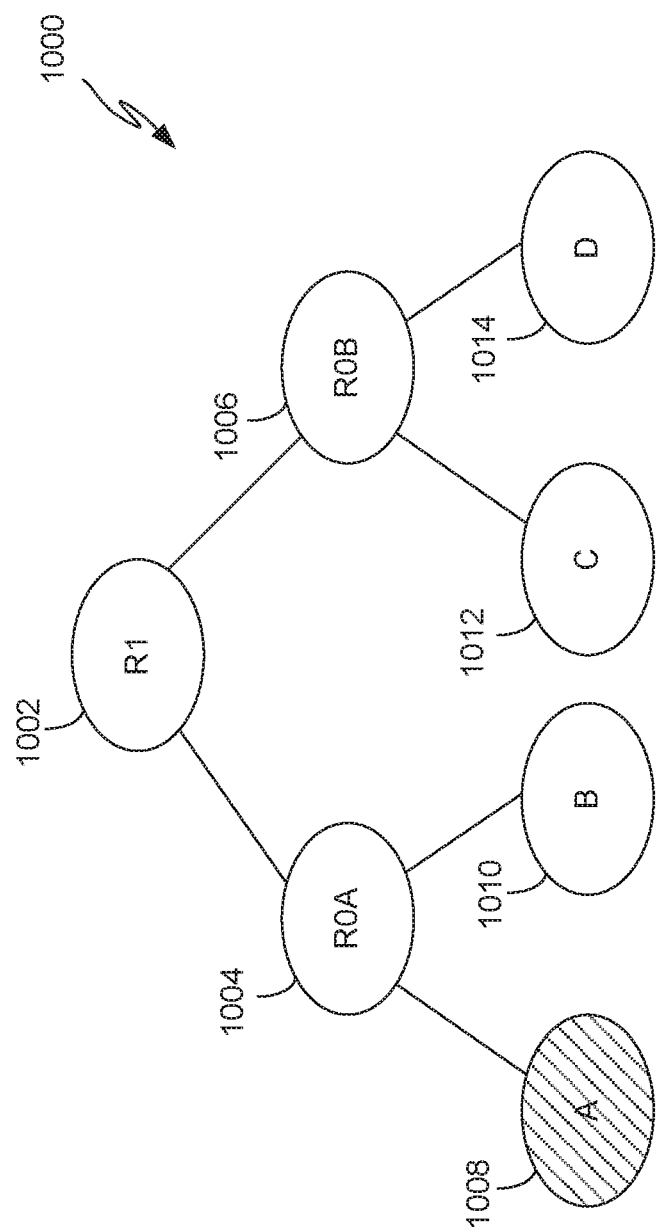
FIG. 10A depicts a RAID tree in which a RAID0 node experiences a transient failure as a result of one of its components going offline.

FIG. 10A depicts an arrangement 1000 in which a mirror node experiences a transient failure as a result of one of its components, component A 1008, going offline. In the figure, a tree of RAID nodes is depicted, with a node R1 1002 having a mirror node R0A 1004 and a mirror node R0B 1006. Mirror node R0A 1004 has two components, component A 1008 and component B 1010, and mirror node R0B 1006 has two components, component C 1012 and component D 1014.

Figure 10B:
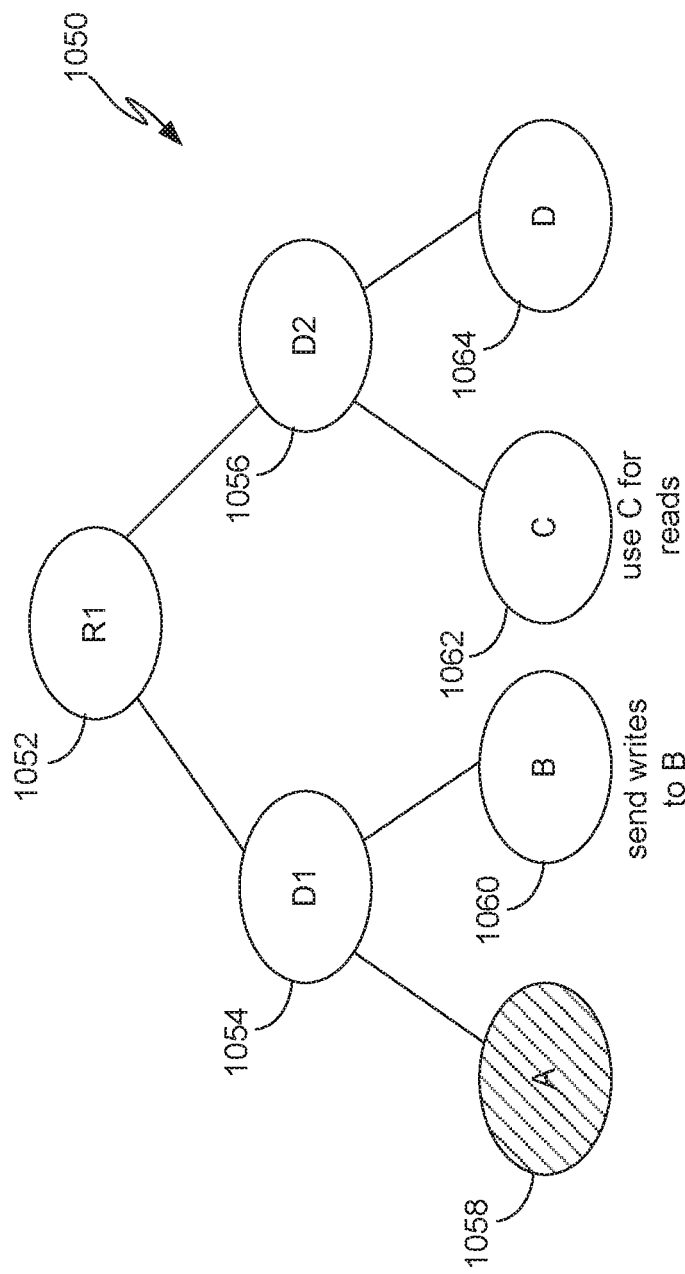
FIG. 10B depicts a RAID tree with a delta node that is used to handle a component failure.

FIG. 10B depicts a delta node in the tree of RAID nodes, that is used to handle a transient failure in a component. In the figure, delta nodes 1054, 1056 take the place of RAID0 nodes 1004, 1006 in FIG. 10A. Delta nodes 1054, 1056 each have a number of components. Though the delta nodes 1054, 1056 are shown with only two components, each can have additional components. When the component (in this case, component A 1058) experiences a failure, writes directed to regions owned by component A 1058 are redirected to another component of delta node 1054, e.g., to component B 1060 in FIG. 10B. In addition, reads directed to regions owned by component A 1058 are redirected to a mirror component, e.g., component C 1062, as component C 1062 is guaranteed to have mirrored all data stored in component A 1058 according to the RAID1 protocol. In general, this technique allows a write to occur on a delta node's component even if some of its components are inaccessible, so that when the transient failure is resolved in the components, the delta node will have all of the data written to its other components during the transient failure. As a result, even if the mirror node, i.e., the delta node 1056, fails during the time period of the transient failure of its components, no data will be lost.

Figure 11:
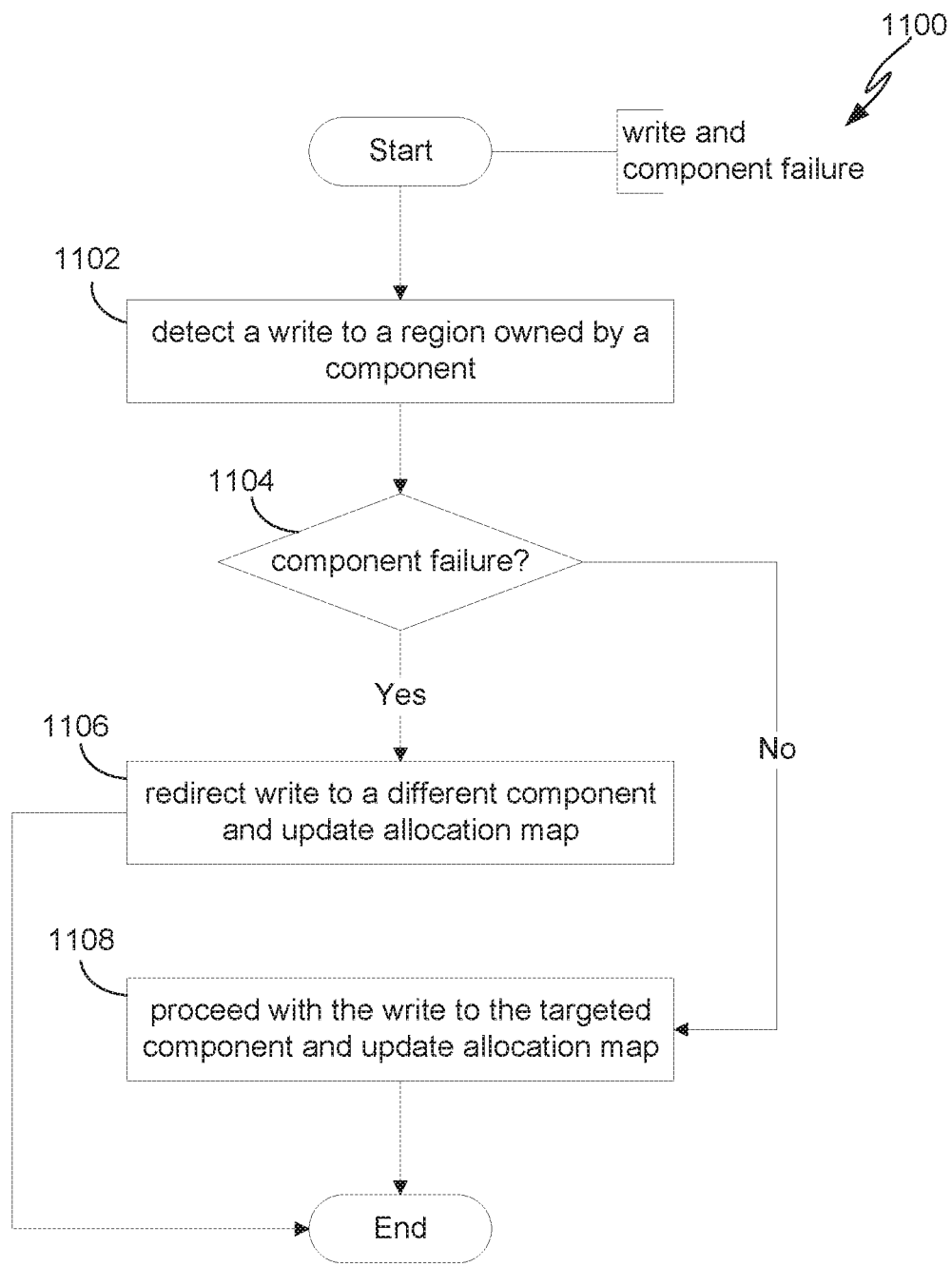
FIG. 11 depicts a flow diagram for operation of the delta node during component failure.

FIG. 11 depicts a flow diagram for operation of the delta node during component failure of one of its components. In step 1102, a write to a region owned by a component of the delta node is detected and the delta node determines in step 1104 whether or not failure has occurred in the component. If so, in step 1106, the delta node redirects the write to a different component. When the write is redirected and completed, the delta node updates its in-memory allocation map to indicate that the region is written. When the different component performs the write, the different component updates its persistent allocation map to indicate the region is written. If there is no failure in the originally targeted component, the write proceeds in step 1108 to that component. When the write is completed to the originally targeted component, the delta node updates its in-memory allocation map to indicate that the region is written.

Figure 12A:
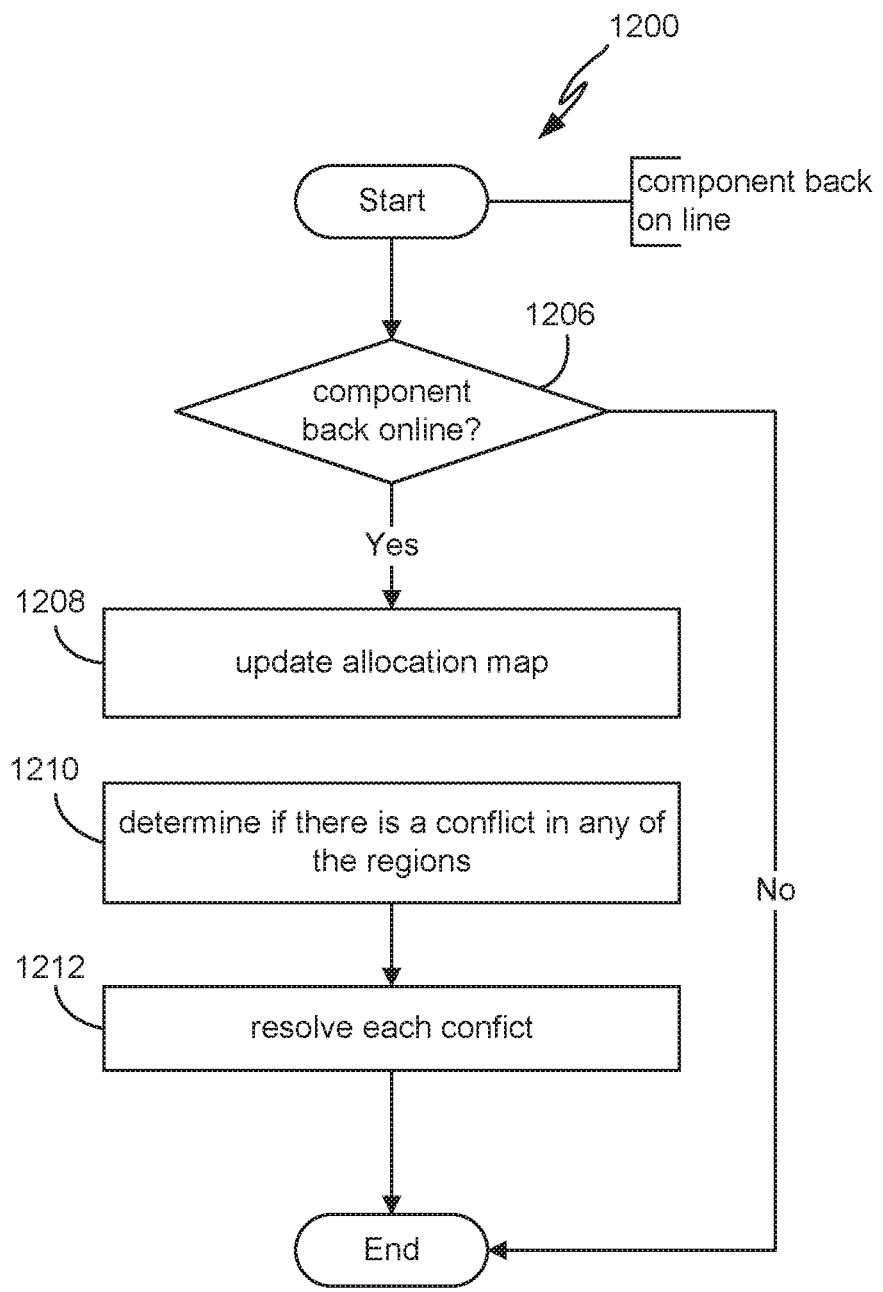
FIG. 12A depicts a flow diagram for operation of the delta node when the failed component comes back online.

FIG. 12A depicts a flow diagram for operation of the delta node when a failed component comes back online. In step 1206, the delta node checks to see if the failed component has come back online. When the failed component does come back online, then in step 1208, the delta node updates its in-memory allocation map from the persistent allocation maps recorded in each of its components. In step 1210, the delta node determines whether a conflict is present among any of the regions in the persistent allocation maps. A conflict can occur because the component that temporarily failed may own regions that were wholly or partially updated while it was offline by other components. In step 1212, for each conflict that is present, the delta node resolves the conflict according to the method depicted in FIG. 12B.

If the component failure is permanent, then the delta node accesses an in-memory allocation map of the mirror node (e.g., node D2 1056 in FIG. 10B) in step 1206 and updates the persistent allocation map of one of its online child components with the in-memory allocation map of the mirror node.

Figure 12B:
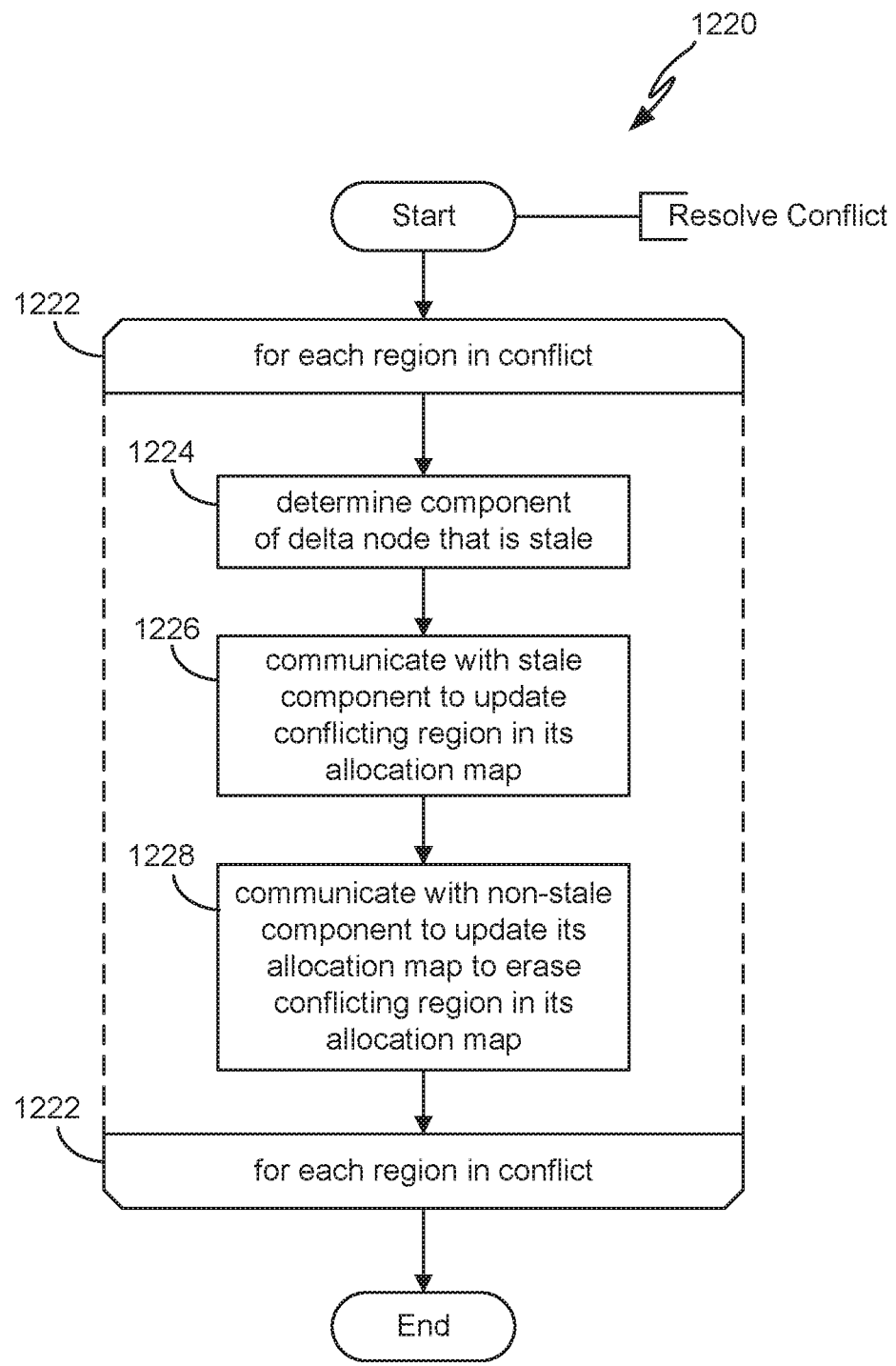
FIG. 12B depicts a flow diagram for resolving a conflict.

FIG. 12B depicts a flow diagram for resolving a conflict. In step 1222, an iterator is established for each region that has a conflict. In the iteration, using a log sequence number (LSN), that is stored in each of the conflicting components (in the failed component, the log sequence number represents the last log sequence number that was recorded in the component prior to its failure) and incremented each time it is recorded in any of the components, the delta node determines in step 1224 which component is stale. In step 1226, the delta node communicates with the stale component to update the conflicting region in its allocation map with the allocation information from the non-stale component and communicates with the non-stale component to erase the allocation information from its allocation map.

Figure 12C:
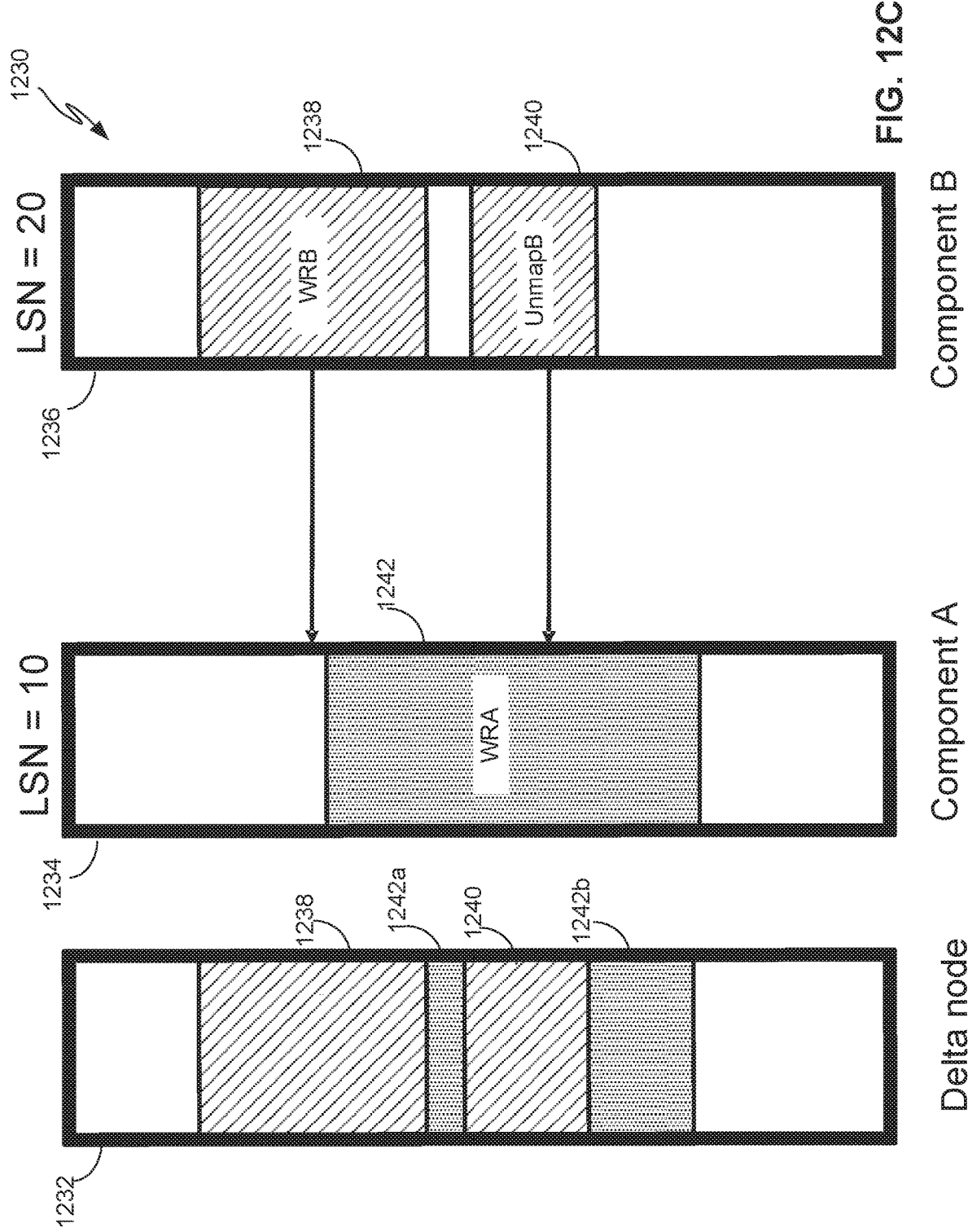
FIG. 12C depicts allocation maps relating to components of the delta node when one of the components fail.

FIG. 12C depicts allocation maps relating to components of the delta node when one of its components fails. In the case illustrated, component A has a write region (WRA 1242) according to its allocation map 1234 and component B has a write region (WRB 1238) and an unmap region (UnmapB 1240) according to its allocation map 1236. Component A temporarily fails after having written to write region (WRA 1242) and later comes back online. The last log sequence number recorded in component A prior to failure is 10. When component A comes back online, the delta node determines that the two regions in B (WRB 1238, UnmapB 1240) conflict with the write region (WRA 1242) in component A, which was written to before component A went offline. As component A is deemed to be more stale based on its log sequence number, the delta node determines that the conflicting region in allocation map 1234 of component A is to be updated in accordance with the allocation information in allocation map 1236 of component B.

Figure 12D:
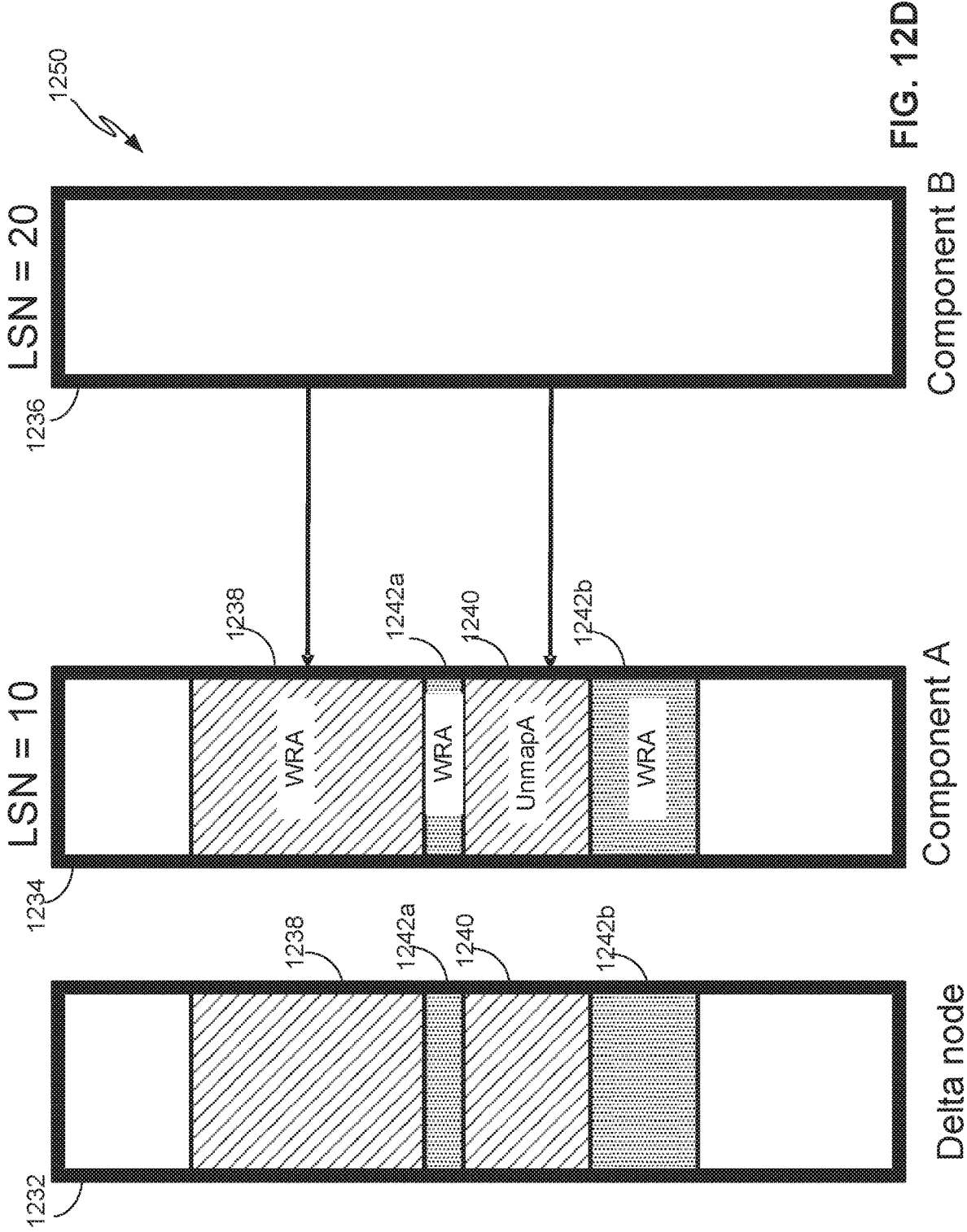
FIG. 12D depicts allocation maps after resolution of conflicts when the failed component comes back online.

FIG. 12D depicts allocation maps relating to components of the delta node after resolution of conflicts that result when the failed component comes back online. As shown, conflicting regions in allocation map 1234 of component A is now updated with allocation information in allocation map 1236 of component B, by overwriting, and allocation information in allocation map 1236 of component B is erased, so that a region resides on only one component of the delta node. Thus, component A has four regions, 1238, 1242*a*, 1240, 1242*b* in its allocation map 1234 instead of the single region 1242. After overwriting the conflicting regions in allocation map 1234, in-memory allocation map 1232 for the delta node is modified to point to component A for all of the regions of component A that have been updated. After allocation map 1234 of component A is updated, the copying of the data stored in the backing physical storage of component B into the backing physical storage of component A can occur later, and in some embodiments, as a background operation. the update of the data stored in the re-allocated regions of the component can occur later, and in some embodiments, as a background operation.

Figure 12E:
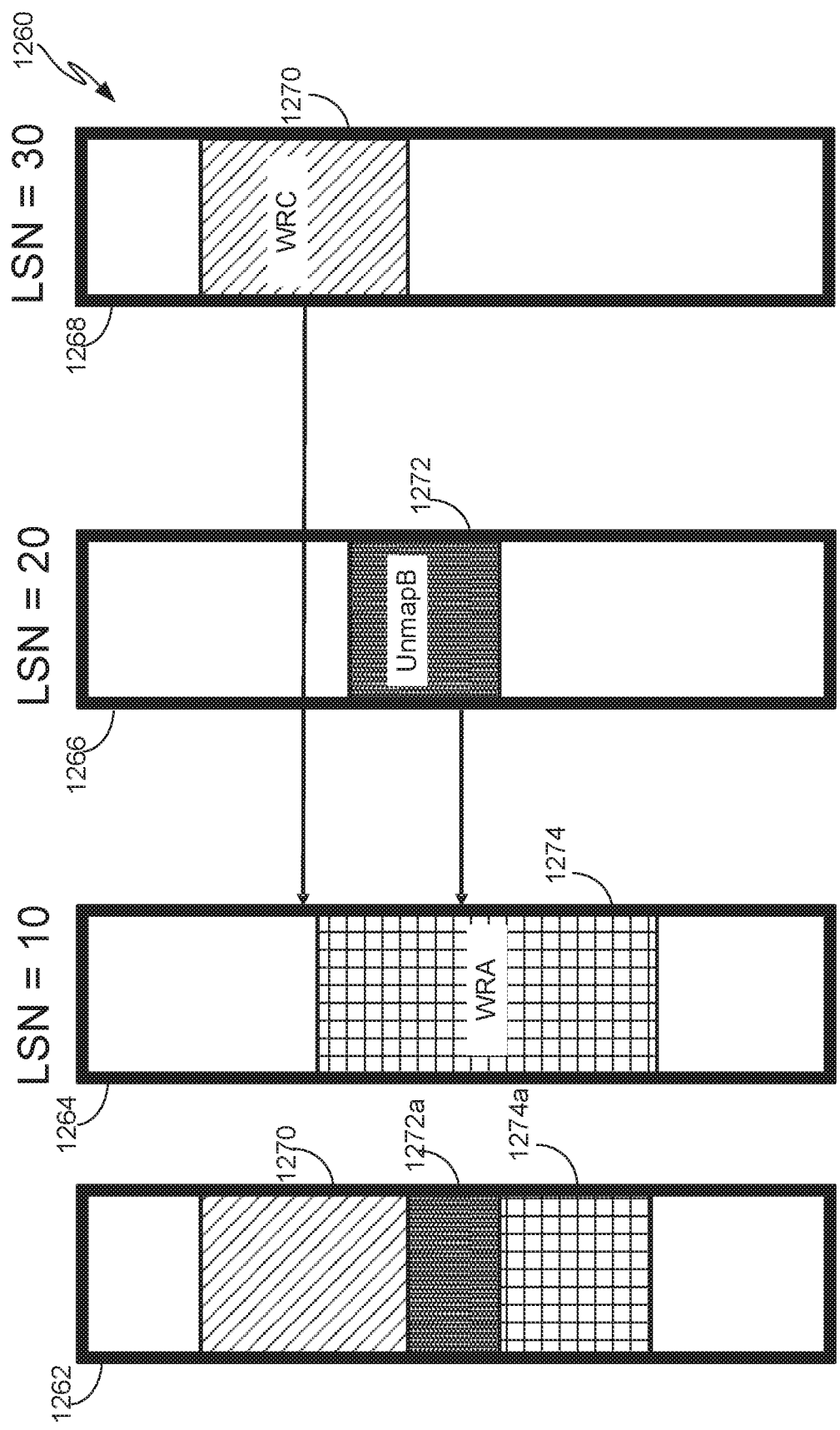
FIG. 12E depicts allocation maps relating to components of the delta node when two of the components fail.

FIG. 12E depicts allocation maps relating to components of the delta node after two of its components that failed come back online. In this case, component A which temporarily failed and came back online has a write region (WRA 1274) that is in conflict with a write region (WRC 1270) in component C and an unmap region (UnmapB 1272) in component B. The delta node resolves the conflicting regions based on the log sequence numbers of the three components, which indicates that component A is the most stale and component C is the least stale. As a result, when the regions 1270, 1272, 1274 are merged, regions 1270, 1272 overwrite region 1274, and the region 1270 overwrites region 1272.

Figure 12F:
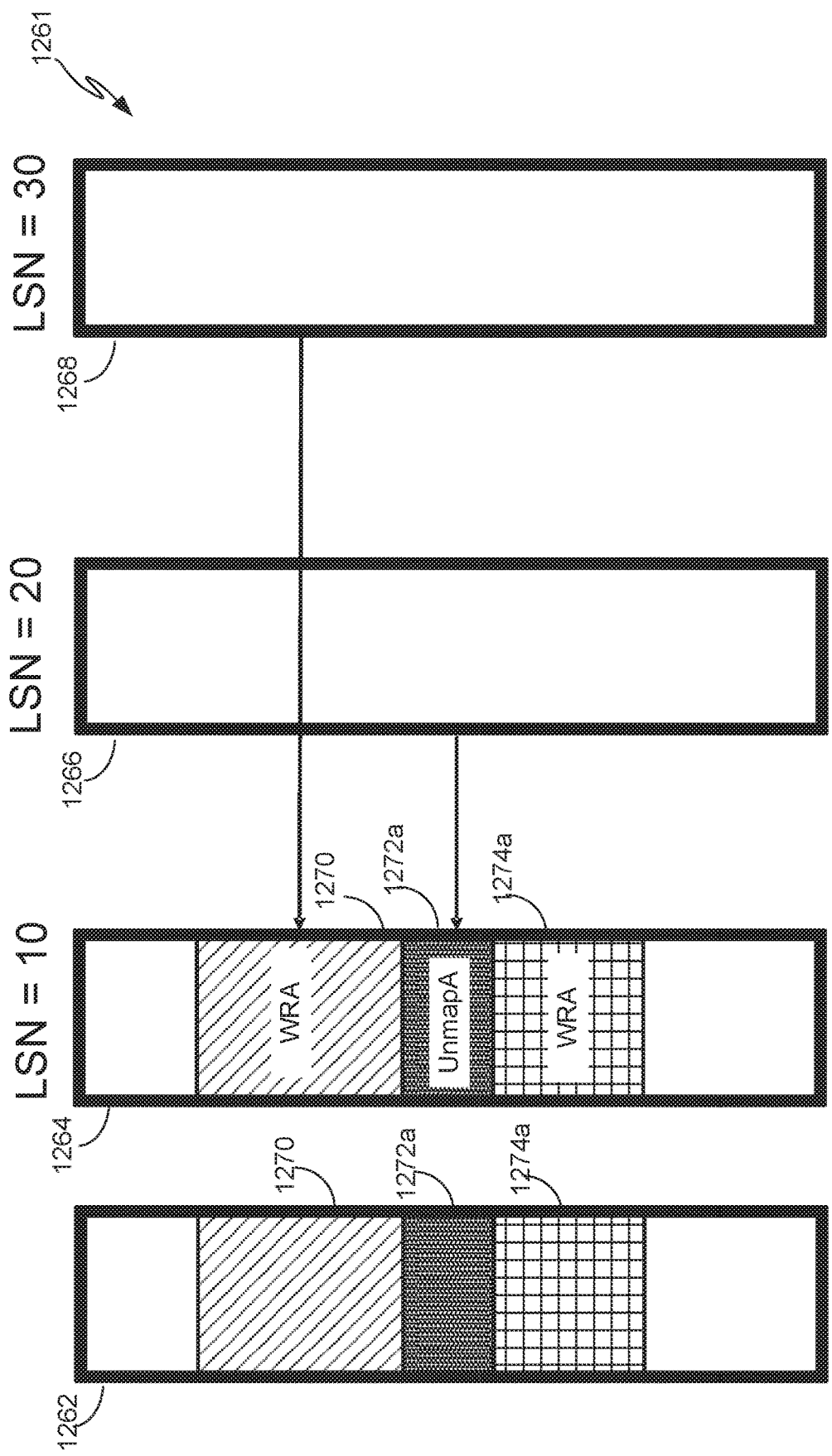
FIG. 12F depicts allocation maps after resolution of conflicts when the failed components come back online.

FIG. 12F depicts allocation maps relating to components of the delta node after resolution of conflicts that result when the failed components come back online. As shown, conflicting regions in allocation map 1264 of component A are updated with allocation information in allocation map 1266 of component B and then with allocation information in allocation map 1268 of component C, by overwriting, and allocation information in allocation map 1266 of component B and allocation map 1268 of component C are erased, so that a region resides on only one component of the delta node. Component A now has three regions, a write region (WRA 1270), an unmap region (UnmapA 1272*a*), and a write region (WRA 1274*a*). After overwriting the conflicting regions in allocation map 1264, in-memory allocation map 1262 for the delta node is modified to point to component A for all of the regions of component A that have been updated. After allocation map 1264 of component A is updated, the copying of the data stored in the backing physical storage of component B and component C into the backing physical storage of component A can occur later, and in some embodiments, as a background operation.

FIG. 12G depicts allocation maps relating to components of the delta node when replacing one of the components that permanently failed. In the case depicted, component A fails permanently and component B replaces component A. The delta node updates allocation map 1286 of component B from an in-memory allocation map of the mirror node. In the case shown, the mirror node has four regions, written regions 1290, 1296 and unmapped regions 1292, 1294. As component B already contains unmapped region 1292 and written region 1296, allocation map 1286 of component B is not updated for these regions. On the other hand, allocation map 1286 of component B does not contain written region 1290 and an unmapped region 1294. Therefore, allocation map 1286 of component B is updated by executing a recovery write on component B for region 1290 (which includes updating the allocation map 1286 to include written region 1290 and copying the data stored in the backing physical storage of components of the mirror node into the backing physical storage of component B) and a recovery unmap on component B for region 1294 (which includes updating the allocation map 1286 to include unmapped region 1294). When multiple components A1, A2, . . . , An fail, they may be replaced by multiple components B1, B2, ..., Bn, respectively, where multiple components B1, B2, ..., Bn may be pre-existing components or newly created empty components.

Figure 13A:
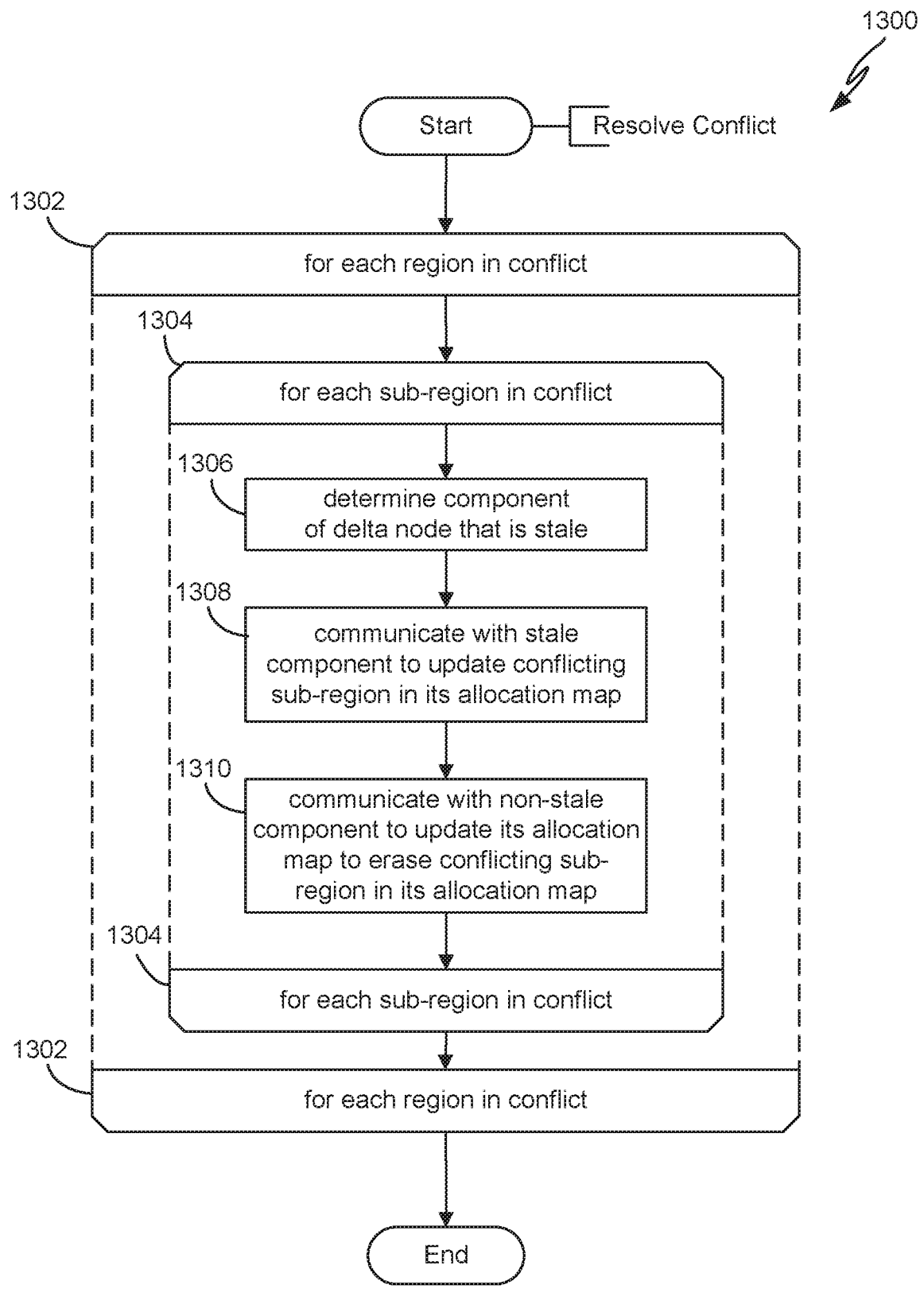
FIG. 13A depicts a flow diagram for resolving conflicts for regions and sub-regions.

FIG. 13A depicts a flow diagram 1300 for resolving conflicts when the in-memory allocation map of the delta node (or RF node) is divided into equal-sized regions (e.g., having a size equal to an integer multipole of a block size) and the persistent allocation maps of the components of the delta node are divided into equal-sized sub-regions (e.g., blocks). In one embodiment, the region size is 4 MB and the sub-region size is 4 kB.

In the flow diagram, two iterators are created. The first iterator 1302 operates to examine each region for a conflict. The second iterator 1304 operates to examine each sub-region for a conflict. In step 1306, to reconcile a conflicting sub-region, the component whose sub-region is stale is determined according to its last recorded log sequence number. The RF node then communicates with the stale component to update the conflicting sub-region in its allocation map with the allocation information from the non-stale component (step 1308), and communicates with the non-stale component to erase the allocation information from its allocation map (step 1310). After all conflicting sub-regions within a conflicting region have been resolved, the next conflicting region is selected for processing in the same manner as described above.

Figure 13B:
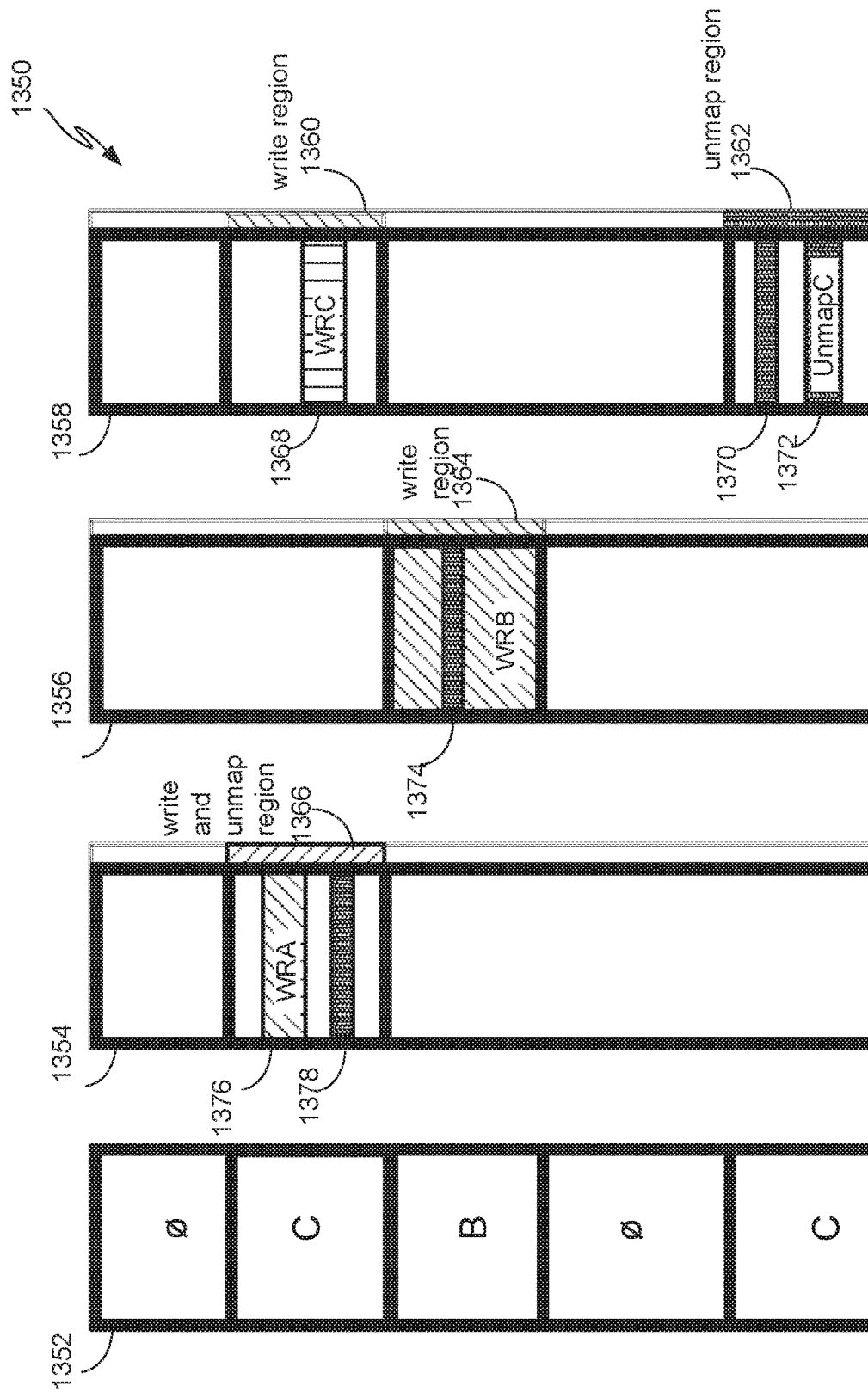
FIG. 13B depicts allocation maps for resolving conflicts for regions and sub-regions.

FIG. 13B depicts allocation maps of components of a delta node that depict resolution of conflicts for regions and sub-regions. In FIG. 13B, component C owns region 1360 and region 1362. In addition, component B owns region 1364 and component A owns region 1366. Within region 1360, component C has only written to sub-region 1368, and within region 1362, component C has unmapped sub-regions 1370, 1372. Within region 1364, component B has only written to sub-region 1374. Within region 1366, component A has written to sub-region 1366 and has unmapped sub-region 1378.

When the delta node carries out the method of FIG. 13A, it will detect a conflict between region 1360 of component C and region 1366 of component A. Upon detecting this conflict, the delta node will execute the iterator 1304 to determine and resolve any sub-region conflicts. For any sub-region conflicts, the delta node will resolve them according to the last log sequence number of the conflicting components. If component A is less stale, the delta node will update region 1360 in allocation map 1358 of component C with allocation information from region 1366 in allocation map 1354 of component A at a sub-region granularity.

In the embodiments described above, the delta node is implemented as an RF node, or the capabilities of the RF node and the delta node can be combined into a single RF node that performs the functions of both the RF node and the delta node.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. In a storage cluster having nodes that are arranged hierarchically, the nodes including a parent node and component nodes that are child nodes of the parent node, the component nodes including a first component node and a second component node, a method of allocating blocks of a logical storage space of a storage object by the parent node to one of the component nodes, comprising:

maintaining a first allocation map for the parent node, wherein second and third allocation maps are also maintained for the first and second component nodes, respectively;

attempting to communicate with the first component node to execute a received first write operation on the first component node and update the second allocation map to indicate that a first-block of the logical storage space is a written block based on the received first write operation, wherein:

the received first write operation targets the first block of the logical storage space; and the first allocation map indicates that the first block is allocated to the first component node; and upon detecting that the first component node is offline so the received first write operation was not executed on the first component node, communicating with the second component node to execute a second write operation targeting the first block of the logical storage space, on the second component node, and update the third allocation map to indicate that the first block is a written block, wherein the second write operation is issued for writing data that was intended to be written by the received first write operation.

2. The method of claim 1, further comprising:

upon detecting that the first component node has come back online, communicating with the first component node to update the second allocation map using the third allocation map.

3. The method of claim 1, further comprising:

upon detecting that the first component node has permanently failed, communicating with the second component node to update the third allocation map using a fourth allocation map.

4. The method of claim 1, wherein the storage object is a virtual disk object that is mirrored across a first mirror node and a second mirror node and the parent node is the first mirror node and a fourth allocation map is maintained for the second mirror node.

5. The method of claim 1, wherein the first allocation map is stored in volatile memory of the parent node and the second and third allocations maps are stored in non-volatile memory of the first and second component nodes, respectively.

6. The method of claim 1, wherein a log sequence number is recorded in the non-volatile memory of the first component node each time the second allocation map is updated and in the non-volatile memory of the second component node each time the third allocation map is updated, and the log sequence number is incremented each time the log sequence number is recorded in the non-volatile memory of any of the component nodes.

7. The method of claim 1, further comprising:

upon detecting that the first component node has come back online, determining a conflict between the second allocation map and the third allocation map, and determining that the second allocation map is stale based on the log sequence numbers recorded in the non-volatile memory of the first and second component nodes.

8. The method of claim 1, wherein the first allocation map allocates blocks to the component nodes at a granularity of a block.

9. The method of claim 1, wherein the first allocation map allocates blocks to the component nodes at a granularity of multiple blocks.

10. A non-transitory computer readable medium comprising instructions that are executable in a computer system, which is a parent node in a storage cluster having a plurality of hierarchically arranged nodes, the nodes further including component nodes that are child nodes of the parent node, the component nodes including a first component node and a second component node, wherein the instructions when executed in the computer system cause the computer system to carry out a method of allocating blocks of a logical storage space of a storage object to one of the component nodes, said method including the steps of:

maintaining a first allocation map for the parent node, wherein second and third allocation maps are also maintained for the first and second component nodes, respectively;

attempting to communicate with the first component node to execute a received first write operation on the first component node and update the second allocation map to indicate that a first-block of the logical storage space is a written block based on the received first write operation, wherein:

the received first write operation targets the first block of the logical storage space;

the first allocation map indicates that the first block is allocated to the first component node;

upon detecting that the first component node is offline so the received first write operation was not executed on the first component node, communicating with the second component node to execute a second write operation targeting the first block of the logical storage space, on the second component node, and update the third allocation map to indicate that the first block is a written block, wherein the second write operation is issued for writing data that was intended to be written by the received first write operation.

11. The non-transitory computer readable medium of claim 10, wherein the method further includes:

upon detecting that the first component node has come back online, communicating with the first component node to update the second allocation map using the third allocation map.

12. The non-transitory computer readable medium of claim 10, wherein the method further includes:

upon detecting that the first component node has permanently failed, communicating with the second component node to update the third allocation map using a fourth allocation map.

13. The non-transitory computer readable medium of claim 10, wherein the storage object is a virtual disk object that is mirrored across a first mirror node and a second mirror node and the parent node is the first mirror node and a fourth allocation map is maintained for the second mirror node.

14. The non-transitory computer readable medium of claim 10, wherein the method further includes:

upon detecting that the first component node has come back online, determining a conflict between the second allocation map and the third allocation map, and determining that the second allocation map is stale based on the log sequence numbers recorded in the non-volatile memory of the first and second component nodes.

15. The non-transitory computer readable medium of claim 10, wherein the first allocation map allocates blocks to the component nodes at a granularity of a block.

16. The non-transitory computer readable medium of claim 10, wherein the first allocation map allocates blocks to the component nodes at a granularity of multiple blocks.

17. A storage cluster having nodes that are arranged hierarchically, the nodes comprising:
   a parent node; and
   component nodes that are child nodes of the parent node, the component nodes including a first component node and a second component node,
   wherein the parent node is programmed to carry out a method of allocating blocks of a logical storage space of a storage object to one of the component nodes, said method including the steps of:
   maintaining a first allocation map for the parent node, wherein second and third allocation maps are also maintained for the first and second component nodes, respectively;
   attempting to communicate with the first component node to execute a received first write operation on the first component node and update the second allocation map to indicate that a first-block of the logical storage space is a written block based on the received first write operation, wherein:
   the received first write operation targets the first block of the logical storage space;
   the first allocation map indicates that the first block is allocated to the first component node;
   upon detecting that the first component node is offline so the received first write operation was not executed on the first component node, communicating with the second component node to execute a second write operation targeting the first block of the logical storage space, on the second component node, and update the third allocation map to indicate that the first block is a written block, wherein the second write operation is issued for writing data that was intended to be written by the received first write operation.

18. The storage cluster of claim 17, wherein the method further includes the step of:
   upon detecting that the first component node has come back online, communicating with the first component node to update the second allocation map using the third allocation map.

19. The storage cluster of claim 17, wherein the method further includes the step of:
   upon detecting that the first component node has permanently failed, communicating with the second component node to update the third allocation map using a fourth allocation map.

20. The storage cluster of claim 17, wherein the storage object is a virtual disk object that is mirrored across a first mirror node and a second mirror node and the parent node is the first mirror node.

* * * * *